United States Patent [19]
Fujiwara

[11] Patent Number: 5,478,471
[45] Date of Patent: Dec. 26, 1995

[54] SLUDGE SCRAPING APPARATUS

[76] Inventor: Michihiro Fujiwara, 13-37-1006, Mikuni Honmachi 2-chome, Yodogawa-ku, Osaka-shi, Osaka 532, Japan

[21] Appl. No.: 175,436
[22] PCT Filed: May 10, 1993
[86] PCT No.: PCT/JP93/00613
§ 371 Date: Jan. 12, 1994
§ 102(e) Date: Jan. 12, 1994
[87] PCT Pub. No.: WO93/23136
PCT Pub. Date: Nov. 25, 1993

[30] Foreign Application Priority Data

| May 14, 1992 | [JP] | Japan | 4-043977 U |
| Jul. 9, 1992 | [JP] | Japan | 4-226336 |
| Oct. 23, 1992 | [JP] | Japan | 4-084155 U |
| Dec. 15, 1992 | [JP] | Japan | 4-094053 U |

[51] Int. Cl.$^6$ ................................. B01D 21/20
[52] U.S. Cl. .......................... 210/527; 210/531
[58] Field of Search .................. 210/525, 527, 210/531, 523

[56] References Cited

U.S. PATENT DOCUMENTS

| 2,101,079 | 12/1937 | Lund | 210/527 |
| 2,101,081 | 12/1937 | Lund | 210/527 |
| 3,868,323 | 2/1975 | Fux | 210/527 |
| 4,401,576 | 8/1983 | Meurer | 210/525 |
| 4,514,303 | 4/1985 | Moore | 210/525 |
| 4,927,537 | 5/1990 | Meurer | 210/527 |

FOREIGN PATENT DOCUMENTS

| 59-55188 | 4/1984 | Japan . |
| 60-128708 | 8/1985 | Japan . |
| 63-1606 | 1/1988 | Japan . |
| 1228513 | 9/1989 | Japan . |
| 487604 | 3/1992 | Japan . |
| 1504518 | 3/1978 | United Kingdom . |

Primary Examiner—Christopher Upton

[57] ABSTRACT

A work member comprising a sludge scraping member is guided by a monorail guide so that the guide and work member can be constructed in the most simplified form, and the working performance can be made excellent at the same time. By simplification of the construction, the installation work can be made easily, and the running and maintenance costs become low.

6 Claims, 22 Drawing Sheets

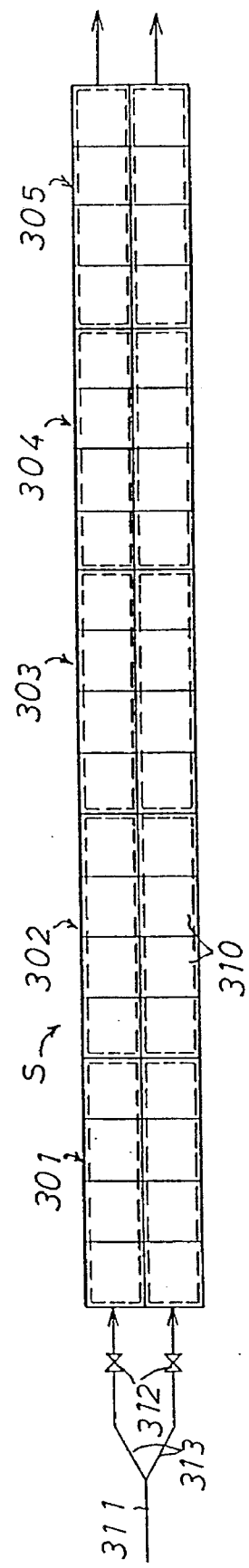
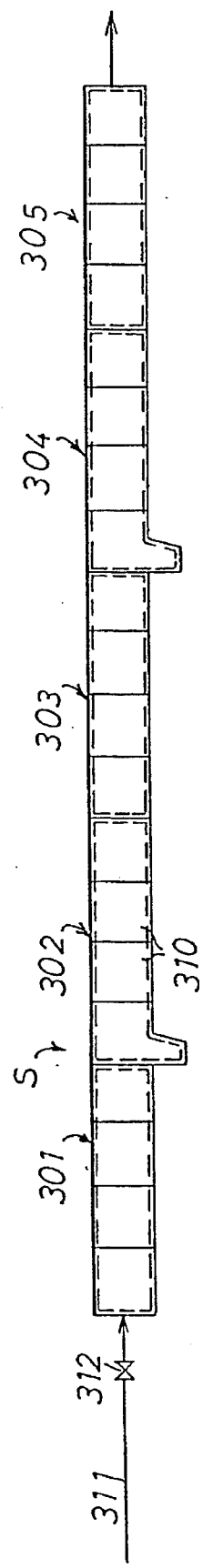
Fig.17
Fig.18

SLUDGE SCRAPING APPARATUS

FIELD OF THE INVENTION

The present invention relates to a sludge scraping apparatus for treating by scraping sludge or sand sedimenting in a treatment pool such as first or last sedimentation pool in one direction of the pool.

BACKGROUND ART

For example, in the first or last sedimentation pool of sewage a treatment plant, it is designed to sediment sludge in the bottom of the pool, and scrape it in one direction of the pool, and discharge the sludge out of the pool. The design is the same in a tap water treating plant.

As one method of sludge scraping, the flight circulation chain driving system is known.

This system comprises a plurality of rotary shafts rotatably mounted with the axial center directed in the width direction of the pool, sprockets mounted on each rotary shaft by two pieces each set apart, and right and left chains applied through these sprockets. At the outer side of the chains, a plurality of flights (scraping plates) are provided at specific intervals in the circulation direction, and as these flights move along on the guide rails provided in the bottom of the pool, the flights scrape and collect the sludge in the bottom of the pool in one direction, and bring the sludge to the sludge pit. The sludge is pumped out of the pit and discharged out of the pool.

This chain driving system is large and complicated in structure, expensive, and difficult to install, and it is high in maintenance cost because of circulatory motion, and is inferior in economy.

On the other hand, instead of the chain circulation system, the system of moving along the bottom of the pool linearly and reciprocatively is known. The system comprises a longitudinal guide (guide rail) provided in the bottom of the pool, a work member for moving along the guide, drive means (rope or the like) for moving the work member reciprocatively, and a scraping member attached to the work member, and it is designed to scrape and collect the sludge settling in the bottom of the treatment pool in one direction by the motion of the scraping member, and discharge out of the pool.

It has the following defects.

In addition to guides and their mounting devices, two guides, right and left, are provided apart from each other in the width direction of the pool, which require a large work member straddling widely between the guides. Accordingly, the structure was very large and complicated, and it was expensive and difficult in installation, and still more the maintenance control cost was high for keeping circular motions and it was not economical.

It is hence a primary object of the invention to present an apparatus which is simple in the entire structure and easy to install, and inexpensive on the whole.

SUMMARY OF THE INVENTION

The invention presents a sludge scraping apparatus comprising a guide having a longitudinal direction in a sludge scraping direction of a treatment pool, a work member moving along the guide, drive means for moving the work member, and a scraping member attached to the work member, thereby scraping and collecting the sludge deposited in the bottom of the treatment pool at least in one direction by the motion of the scraping member, and discharging out of the pool, wherein the guide is a monorail, and the work member is designed to move reciprocatively along the guide.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein

FIG. 17 is a plan view showing an embodiment of a sludge scraping apparatus of underground installation type;

FIG. 18 is a side view of the sludge scraping apparatus of FIG. 17;

PREFERRED EMBODIMENTS OF THE PRESENT INVENTION

To facilitate a better understanding of the present invention, the present invention will be described with reference to the accompanying drawings.

Figure 1:
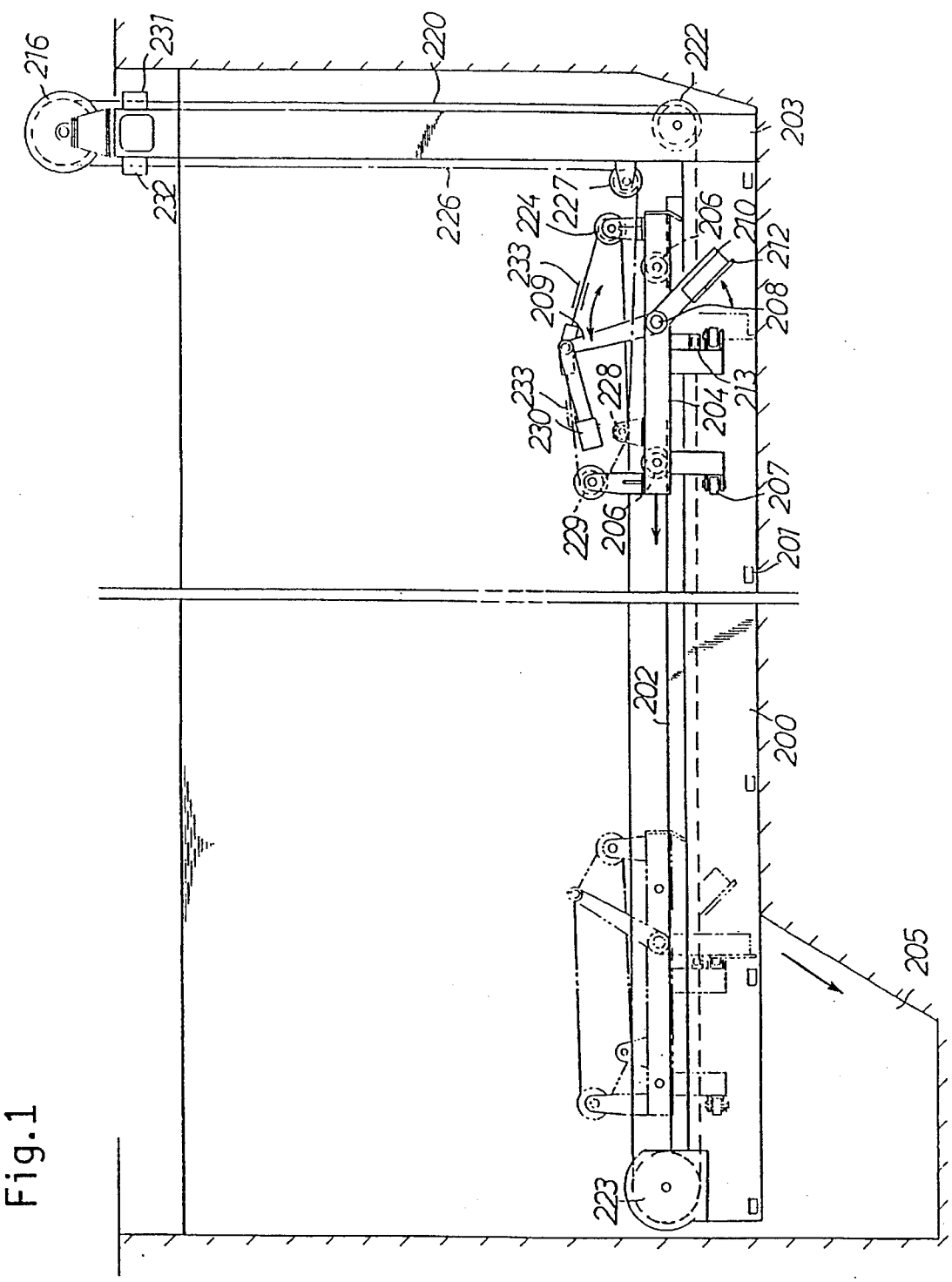
FIG. 1 is a side view showing an embodiment of the invention.
Figure 2:
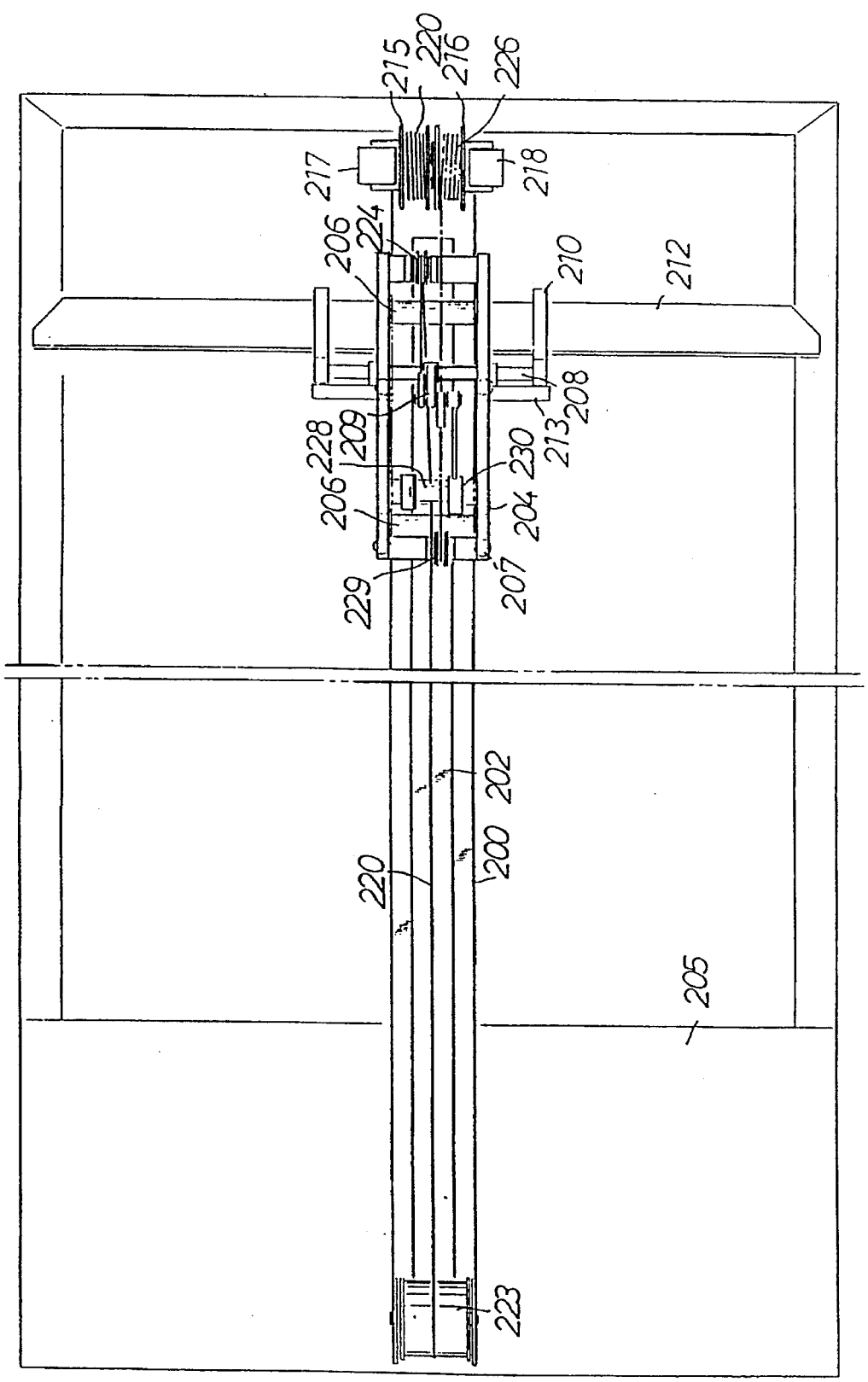
FIG. 2 is a plan view of the embodiment of FIG. 1.

FIG. 1 and FIG. 2 show one embodiment of the invention. The settling pool of this embodiment is a first or final settling pool in sewage treatment plant, and rectangular in a plan view extended in one direction (the lateral direction in the diagram). The settling pool comprises right and left side walls, end walls which form respective end portions in the longitudinal direction, and a bottom wall sloping down moderately to the left side in the diagram. Sludge spontaneously sediments on the bottom of the pool. In this embodiment, numeral 200 denotes a single track type (monorail type) first guide, which is a square tube, and holes 201 for operation when fixing are provided at proper side positions of the guide 200, and a longitudinal second guide 202 with a slightly smaller square tube than the guide 200 is fixed thereon. The second guide 202 is also of monorail type. At one end of the first guide 200, a post 203 is disposed, and it is erected and fixed so that the upper end may reach over the pool.

Numeral 204 is a work member, which is a carrier moving in reciprocating manner in the lateral direction in the diagram, and the work member 204 is a frame body, consisting of a main member with a rectangular plane framework, and pedestals extending downward from four positions of the main member. In the front part of a pit 205 side of the work member 204 and its rear part, upper rollers 206, 206 rolling over the second guide member 202 are provided, and side rollers 207 rolling over the side surface of the first guide 200 are disposed at the pedestals so as to contact with all four points.

Numeral 208 is a rotary shaft disposed as a lateral shaft in the intermediate portion between front and rear ends of the work member 204, and an oscillating arm 209 capable of oscillating back and forth is disposed on the rotary shaft 208 at a position corresponding to the inside of the work member 204. A pair of right and left lower arms 210 are provided on the rotary shaft 208 at positions corresponding to the outside of the work member 204.

The lower arms 210 are furnished with a band-shaped scraping member 212. The scraping member 212 is designed to oscillate always reversely when the oscillating arm 209 oscillates back and forth. The scraping member 212 can select both the backward slant position indicated by the solid line in FIG. 1 and the vertical position indicated by virtual line. Numeral 213 is a stopper in vertical position.

At the upper end of the post 203, a pair of right and left drive drums (a part of driving means) 215, 216 are provided. The drums 215, 216 can be independently rotated by drive sources (a part of driving means) 217, 218. A first wire (wire rod, a part of driving means) 220 indicated by solid line which is wound on one drum 215 passes through the first guide 200 along the broken line through a first wheel 222 provided at the back side of the rear part of the post 203, and moves through a second wheel 223 provided at the end portion of the guide 200.

The first wire 220 is connected to the oscillating arm 209 through a third wheel 224 in the rear part of the work member 204 from the second wheel 223. On the other hand, a second wire (wire rod, a part of driving means) 226 indicated by single dot chain line is wound on the other drum 216, and is connected to the oscillating arm 209 through a fifth wheel 228 and a sixth wheel 229 on the work member 204 from a fourth wheel 227 provided at the front side of the post 203.

Numeral 230 is a balancer provided at the front end of the oscillating arm 209, and is used for securely changing over to the backward slant position of the scraping member 212. Numerals 231, 232 are right and left independent action type brakes provided at the front and rear side of the post 203, and 233 is a spring provided in the wires 220, 226.

This scraping apparatus repeats the cycle of scraping in the left direction in the diagram and returning to the right direction. That is, in scraping motion, the drum 215 is driven while the brake 231 is released, and therefore the first wire 220 is pulled. At this time, the brake 232 is in locked state, and the springs 233, 233 are stretched, so that the motion of the work member 204 by the second wire 226 is locked. Consequently, the oscillating arm 209 oscillates in the right direction in FIG. 1, so that the scraping member 212 is held in the vertical position. Accordingly, the work member 204 will not be driven before the oscillation of the scraping member 212 to the vertical position.

Upon reaching this state, the locked brake 232 is released, and the drum 215 is driven, and the work member 204 is driven in the left direction in the diagram, thereby exerting scraping motion. The work member 204 operates stably by the upper roller 206 and side roller 207. This operation is realized by the winding direction rotation of the drum 215 and the loosening direction rotary motion of the drum 216.

When the scraping member 212 reaches up to the pit 205, the scraped and collected sludge is dropped into the pit 205. Afterwards, the brake 231 is locked and the brake 232 is released, and the drum 216 is rotated in the winding direction. As a result, the spring 233 is stretched, and the second wire 226 indicated by single dot chain line is pulled, and the oscillating arm 209 oscillates in the left direction in the diagram, so that the scraping member 212 is changed from the vertical position to the backward slant position. Therefore, the settling sludge will not be scraped back by the scraping member 212.

At this time, the first wire 220 is locked. And when the brake 231 is released and the drum 216 begins to wind up, the second wire 226 is pulled so that the work member 204 is driven in the left direction and returned. At this time, the drum 215 is simultaneously rotated in the loosening direction.

Figure 3:
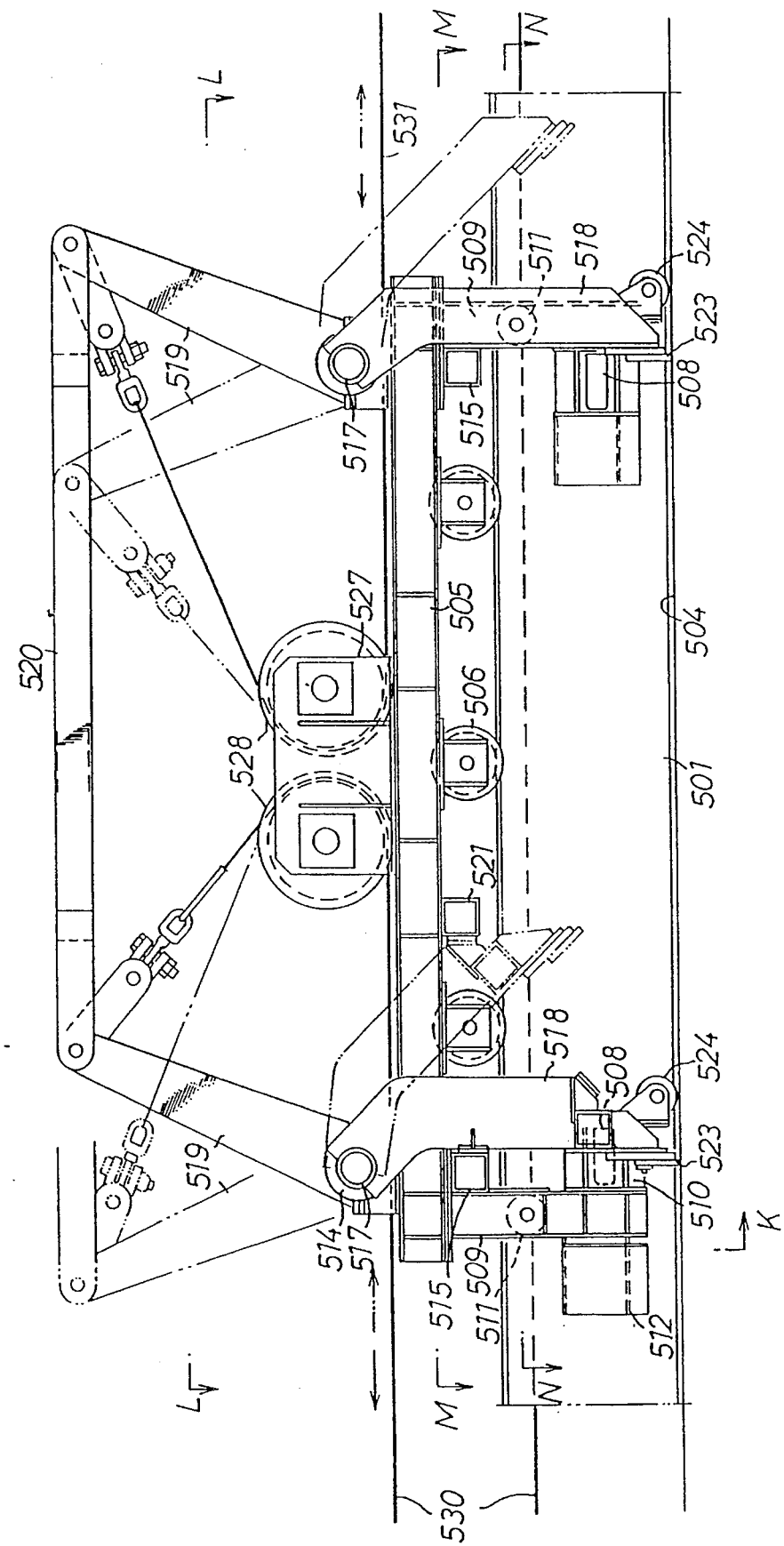
FIG. 3 is a side view showing an embodiment of a double-scraping type sludge scraping apparatus.
Figure 4:
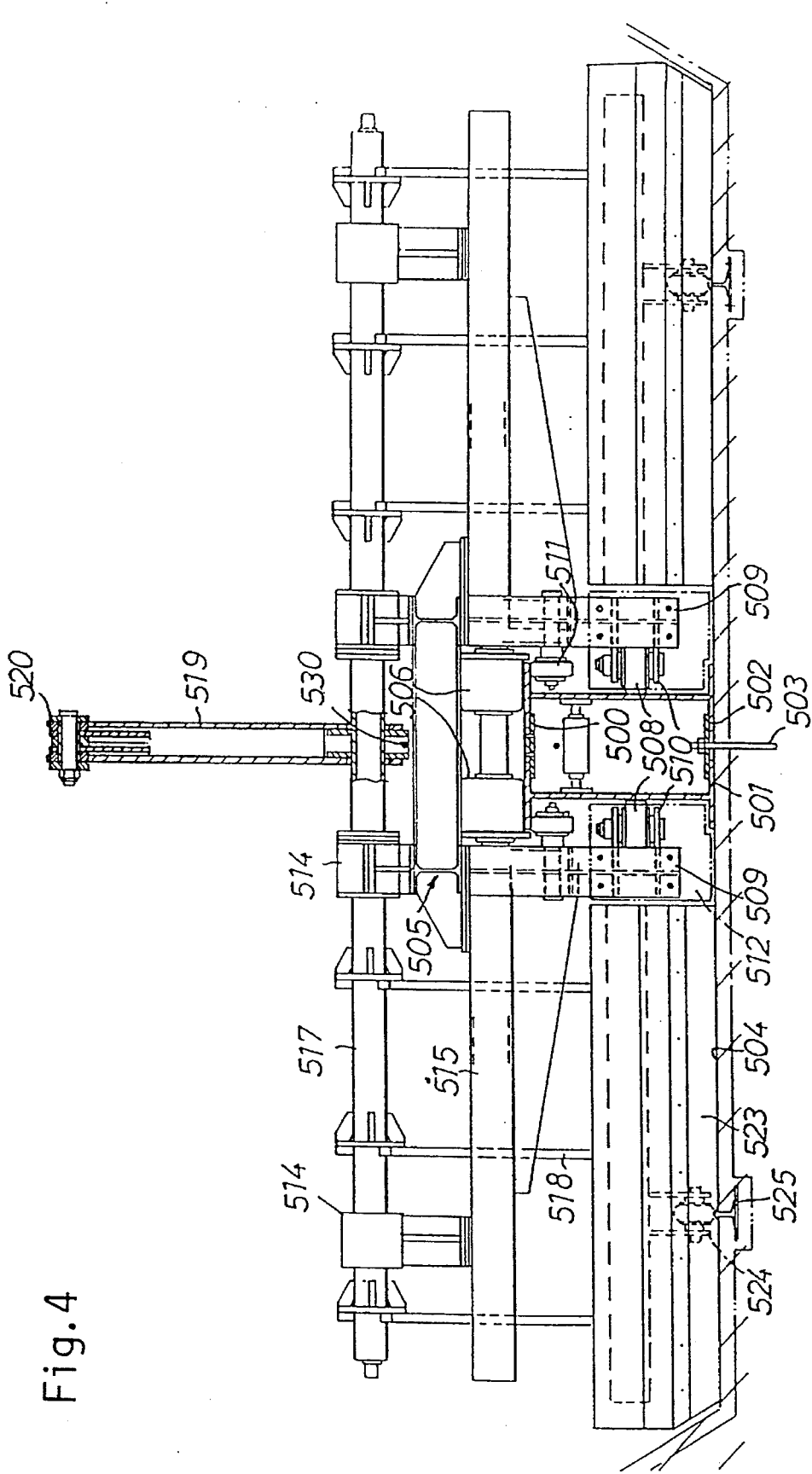
FIG. 4 is a sectional view taken along the line K—K in FIG. 3.
Figure 5:
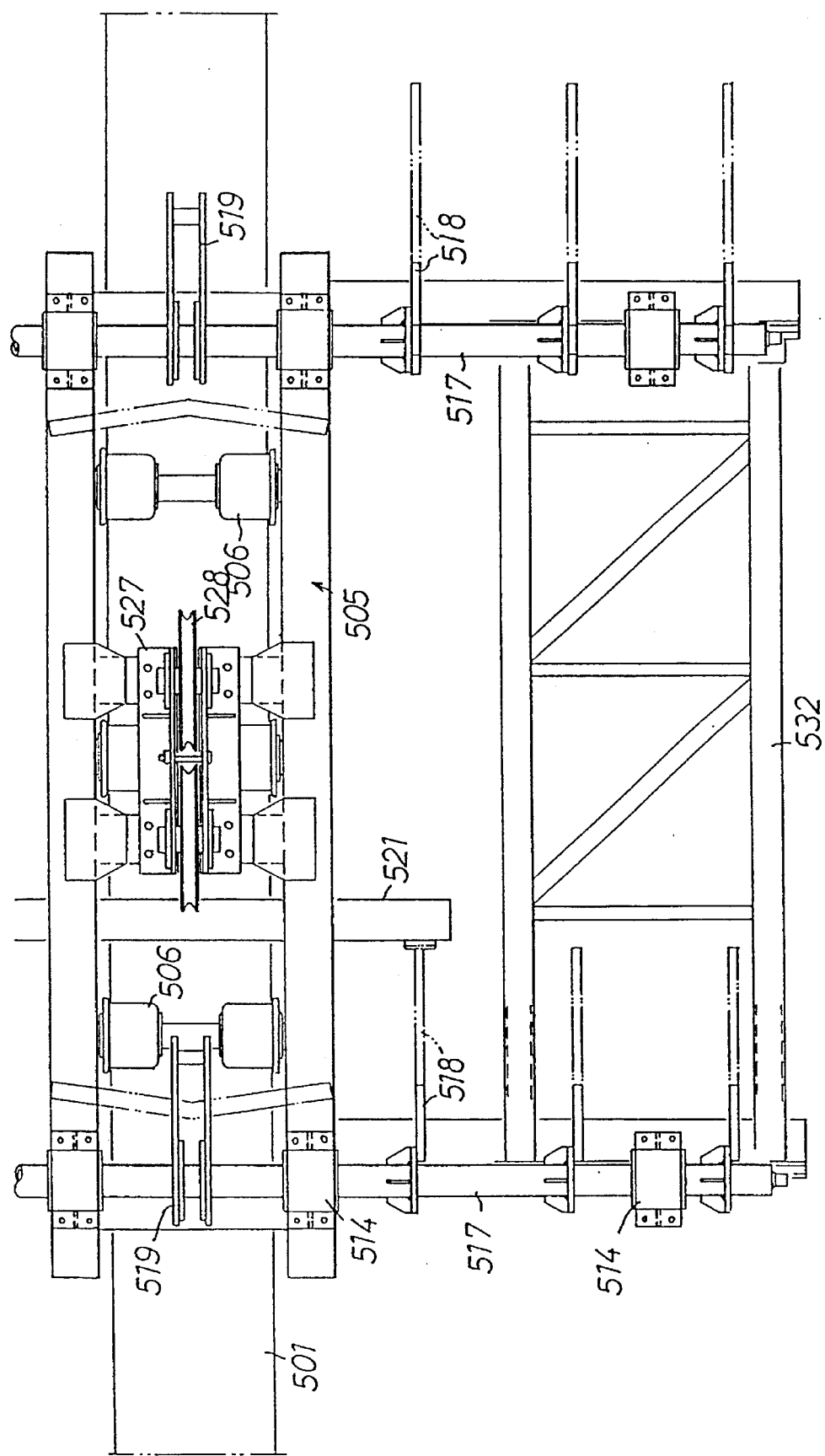
FIG. 5 is a sectional view taken along the line L—L in FIG. 3.

FIG. 3 through FIG. 7 relate to another embodiment of the invention, showing a sludge scraping apparatus of double-scraping type comprising front and rear scraping members 523, 523. In this embodiment, as shown in FIG. 4, using two I-section channel members, they are disposed parallel right and left and joined with a junction panel 500, thereby fabricating one monorail type guide 501. This guide 501 is fixed along the middle of the pool bottom wall 504 by an anchor 503 through a holding plate 502 in the lower part.

The guide 501 is extended in the longitudinal direction of the pool as shown in FIG. 1, and wheels are provided at both ends of the longitudinal direction. Although the post 220 is not disposed at one end (FIG. 1), the driving method is approximately the same as in FIG. 1.

Numeral 505 is a work member, and is formed in a frame body by a pair of right and left main body frames and a transverse member crossing them. Numeral 506 is a lipped upper roller, and is disposed at six points at slightly lower positions of the work member 505. The upper roller 506 rolls over the guide 501.

Figure 7:
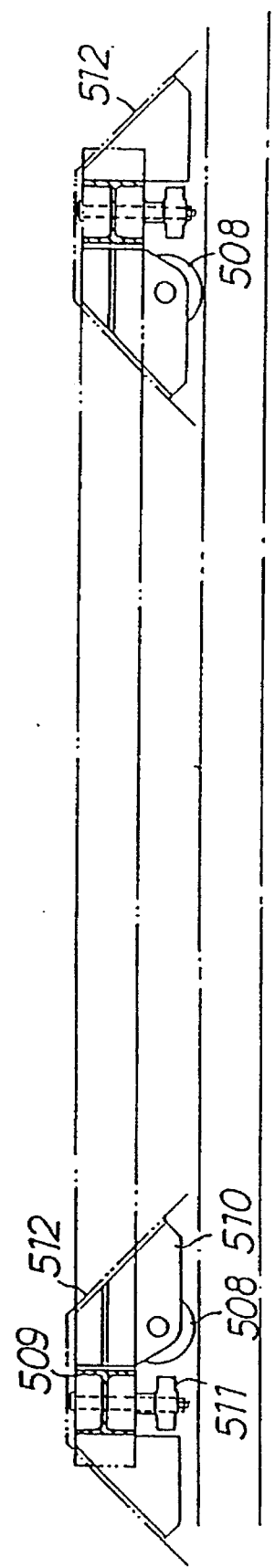
FIG. 7 is a sectional view taken along the line N—N in FIG. 3.

Numeral 508 in FIG. 4 is a side roller, and is disposed through a roller bracket 510 installed on four front and rear pedestals 509 so as to prevent lateral sway by hitting against the side surface of the guide 501. Numeral 511 is a hold-down roller, and is attached to the pedestals 509 so as to hit against the lower surface of the upper lip of the guide 501. At the front and rear sides of the side roller 508, roller covers 512 are provided as shown in FIG. 7.

Numeral 514 in FIG. 3 denotes bearings, four of them 514 are provided at respective four front and rear points of the work member 505, and other bearings 514 in FIG. 3 are fixed on a front stopper 515 disposed so as to extend right and left from the pedestals 509. Rotary shafts 517 are rotatably supported by these bearings 514 above the work member 505. Two rotary shafts 517 are provided parallel at front and rear sides, and three sets of right and left arms 518 are provided on each shaft 517, so as to oscillate back and forth together with interlock arms 519, 519 projecting in the middle of the rotary shafts 517. The front and rear interlock arms 519 are coupled with an interlock link 520.

The front and rear arms 518 are constituted as to be in vertical position by hitting against the front stopper 515, and set in rear oblique retracted position as the front arm 518 hits against a rear stopper 521 passing through the lower side of the work member 505 and extending right and left therefrom. Numeral 523 is a scraping member for sludge, being a rubber plate, and the scraping member 523 is attached to the lower end of the arm 518, and a roller 524 provided at the rear side thereof is guided by mounting on a rail 525 as shown in FIG. 4.

Numeral 527 in FIG. 3 is a base, and this base 527 is fixed in the middle of the upper side of the work member 505, and two front and rear wheels 528 for guide are provided thereon. Numeral 530 is a first wire, and 531 is a second wire. The first wire 530 is linked to the front side interlock arm 519 through a wheel at the front end of the guide 501 by way of the internal space of the guide 501 from the drive source, and through the front side wheel 528 from above the guide 501. The second wire 531 is coupled to the rear side interlock arm 519 through the rear side wheel 528 by way of a wheel 227 at the rear end of the guide 501 from the drive source.

Figure 6:
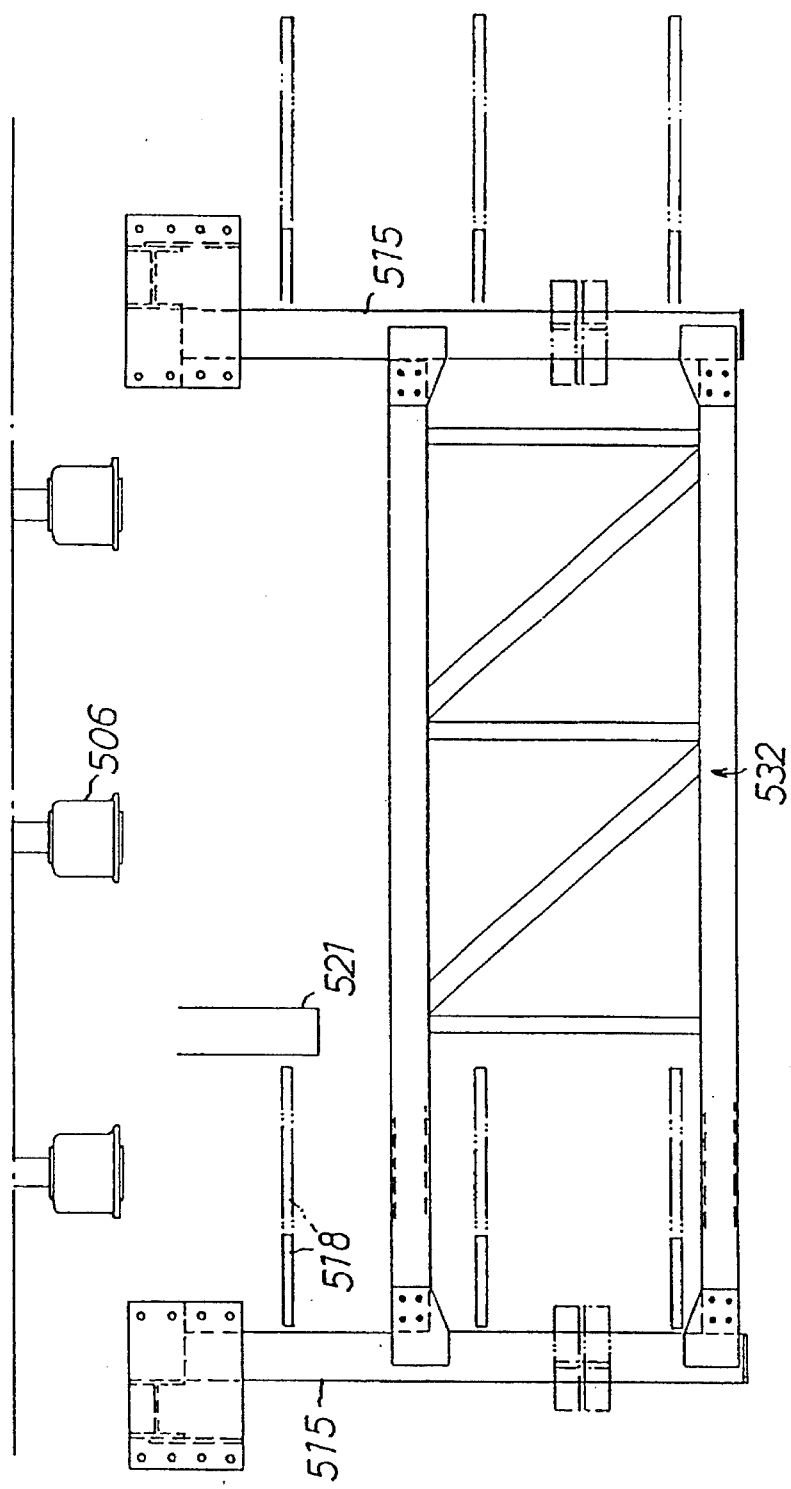
FIG. 6 is a sectional view taken along the line M—M in FIG. 3.

When the first wire 530 and second wire 531 act in the direction of the solid line arrow in FIG. 3, the front and rear interlock arms 519 oscillate backward. As a result, the scraper 523 is set in vertical scraping position. In this position, it is designed to scrape in the pit direction. Having arrived at the pit position, as shown in the virtual line in FIG. 3, the second wire 531 is set in pulling state, and the first wire 530 is in loose state. Accordingly, the interlock arm 519 tilts forward and scraper 523 is set oblique backward, thereby becoming in return position. Incidentally, as shown in FIG. 6, a reinforcing frame 532 is stretched between the front stoppers 515, 515. It may be omitted if the strength of the stoppers 515 is sufficient.

Figure 8:
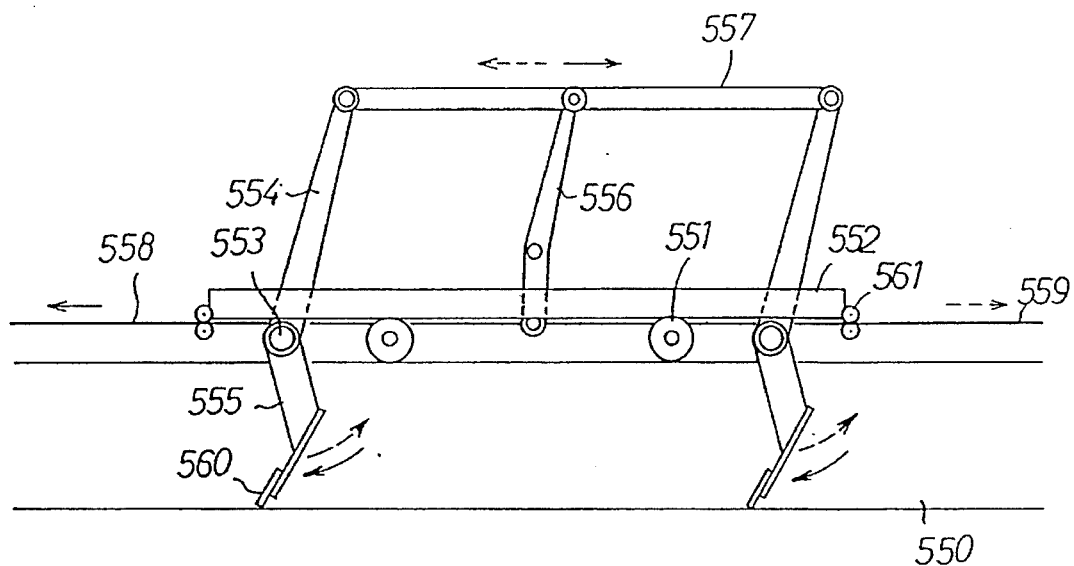
FIG. 8 is a side view schematically showing a second driving method of a sludge scraping apparatus of a two-blade type.

FIG. 8 shows other embodiment for interlocking the scraping member in a sludge scraping apparatus of double-scraping type. Numeral 550 is a guide, which is fixed in the middle of the bottom of the pool. On the guide 550, a work member 552 is movable in reciprocating manner by a roller 551 (together with side roller not shown). Rotary shafts 553 are provided at front and rear portions of the work member 552, and interlock levers 554 and oscillating levers 555 are attached to the shafts 553. In an intermediate position between the front and rear interlock levers 554, an intermediate lever 556 supported on the work member 552 is provided, and a link 557 between the interlock levers 554 is coupled to the upper end of the lever 556, while a first wire 558 and a second wire 559 are coupled to the lower end of the lever 556.

When the first wire 558 is pulled as indicated by solid line arrow, the link 557 moves in the direction of the solid line arrow, and the interlock lever 554 oscillates backward, and a scraping member 560 is set in scraping position. As a result, the sludge is scraped and collected in the scraping direction shown by the solid line arrow described near the scraping member 560. On the other hand, when the second wire 559 is pulled at the pit side, the interlock lever 554 oscillates in the direction of the broken line arrow, and the scraping member 560 moves up in the broken line direction, then, the work member 552 is moved in the return direction shown by the broken line arrow.

Numeral 561 denotes a guide roller. The scraping member 560 may be a single-scraping type, too. In this case, one interlock lever 554 is omitted.

Figure 9:
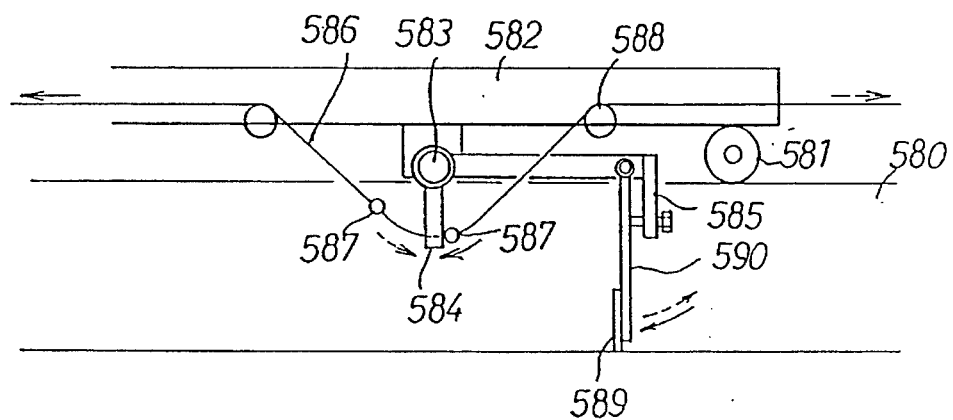
FIG. 9 is a side view schematically showing a third driving method.

In FIG. 9, a rotary shaft 583 is provided on a work member 582 movable along a guide 580 by a roller 581, and a work lever 584 and an L-shaped receiving lever 585 are rotatably disposed on the shaft 583. In the work lever 584, a wire 586 is passing, and the work lever 584 is reciprocatively oscillated by stoppers 587 provided in the wire 586. The wire 586 is guided by a guide roller 588, while a mounting plate 590 mounting a scraping member 589 is disposed on the receiving lever 585 in a manner free to rotate in one direction only.

When the wire 586 is pulled in the direction of solid line arrow, the rear stopper 587 is actuated, and the work lever 584 rotates forward, and the scraping member 589 is set in vertical scraping position by the receiving lever 585. On the other hand, when the wire 586 is pulled in the direction of broken line arrow at the pit side, the work lever 584 is rotated in the reverse direction by the front stopper 587, and the receiving lever 585 is lifted, so that the scraping member 589 is also lifted. The scraping member 589 ascends or descends always in the vertical position. In this mechanism, if the apparatus returns to reach the limit at the pool end wall, the unscraped portion left at the rear end of the pool is small.

Figure 10:
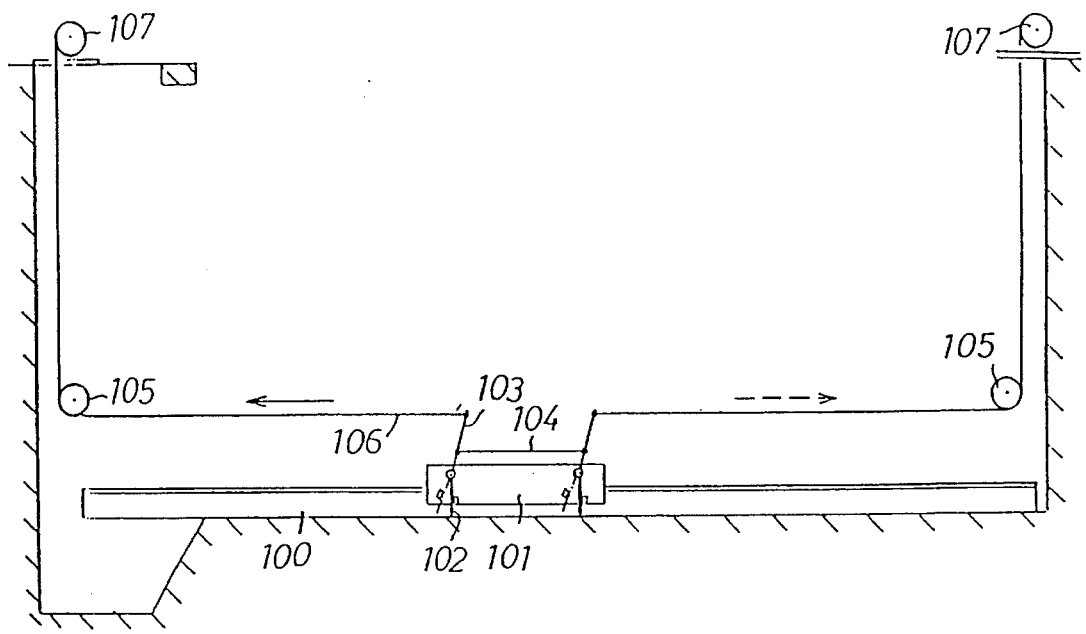
FIG. 10 is a side view showing a fourth example of driving method.
Figure 11:
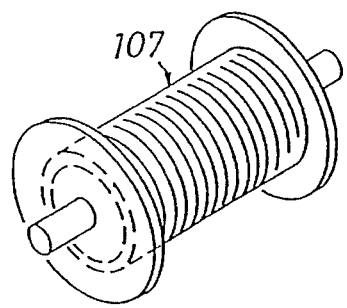
FIG. 11 is a perspective view showing a drum with a built-in motor.
Figure 12:
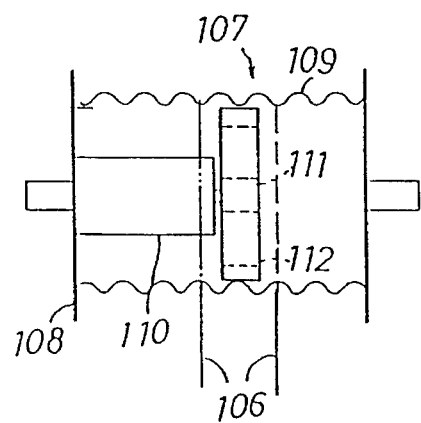
FIG. 12 is a side view schematically showing the drum in FIG. 11.

FIG. 10 to FIG. 12 relate to a different embodiment. Numeral 100 is a guide, 101 is a work member, 102 is a scraping member, 103 is a lever, and 104 is an interlock link. Numeral 105 is a wheel, 106 is a wire, and 107 is a drive device. The drive device 107 incorporates a motor as shown in FIG. 11 and FIG. 12. That is, the device 107 comprises a fixed wheel 108 and a drum 109, and a groove is formed in the drum 109. In the inside, a motor 110 with reduction gear is installed at the fixed wheel 108 side, and it is constituted so that the drum 109 may be rotated and driven as a pinion 111 fixed to the front end of the motor shaft drives an internal gear 112 formed on the drum 109.

A pair of these motor-built-in type drive devices 107 are disposed above the pool, and the wires 106 are wound thereon. When one drive device 107 is driven and the other one is free or rotates reversely, the wire 106 is pulled as indicated by the solid line arrow in FIG. 10, and the scraping member 102 comes in scraping position, while the other scraping member 102 is also set in scraping position through the interlock link 104. As a result, the work body 101 is driven in the pit direction, and scraping is carried out. When the other drive device 107 is driven, the work member 101 is returned in the direction of broken line arrow. At this time, the scraping member 102 escapes obliquely.

The individual drive system as in FIG. 10 may be also employed in FIG. 1 through FIG. 9.

Figure 13:
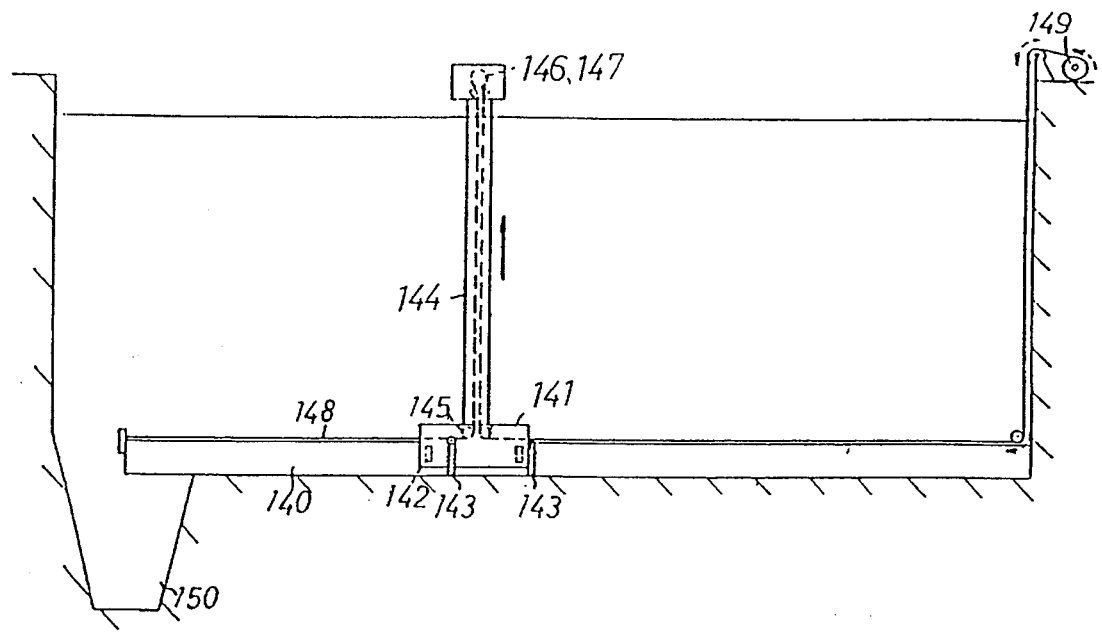
FIG. 13 is a side view showing an embodiment of disposing a drive source so as to be movable above the sludge scraping apparatus.

FIG. 13 shows a further different embodiment of the invention. That is, a guide 140 of monorail type is extended in a longitudinal direction in the bottom of the pool. A work member 141 is U-shaped so as to straddle over the guide 140, and is driven reciprocatively. The work member 141 is provided with a roller 142 and scraping members 143 disposed at right and left sides.

On the work member 141, a hollow column 144 is set up so as to seal the water by extending above the water level. The driving means comprises wheels 145, 145 disposed in the work member 141, other wheel 146 disposed in the upper part of the column 144, a drive source 147 disposed in the upper part of the column 144, and an interlock member 148 such as wire or chain with one end fixed near the front end of the guide 140, being guided to above the pool through the vicinity of the other end of the guide 140 passing above the guide 140 to the wheel 145 in the work member 141, then through inside the column 144 up to the upper wheel 146, and down through the column 144 to the wheel 145 in the work member 141. And by allowing extension of the interlock member 148, it is constituted so as to lift the work member 141 furnished with the column 144 above the pool. Numeral 149 is a drum rotated in order to loosen the interlock member 148.

In usual driving, when the drive source 147 is rotated in normal direction, the work member 141 is driven in the direction of a pit 150 by the interlock member 148. The sediment is collected by two front and rear scraping members 143. When the drive source 147 is rotated reversely, the work member 141 moves in the return direction by the interlock member 148. Usually this operation is repeated.

Figure 14:
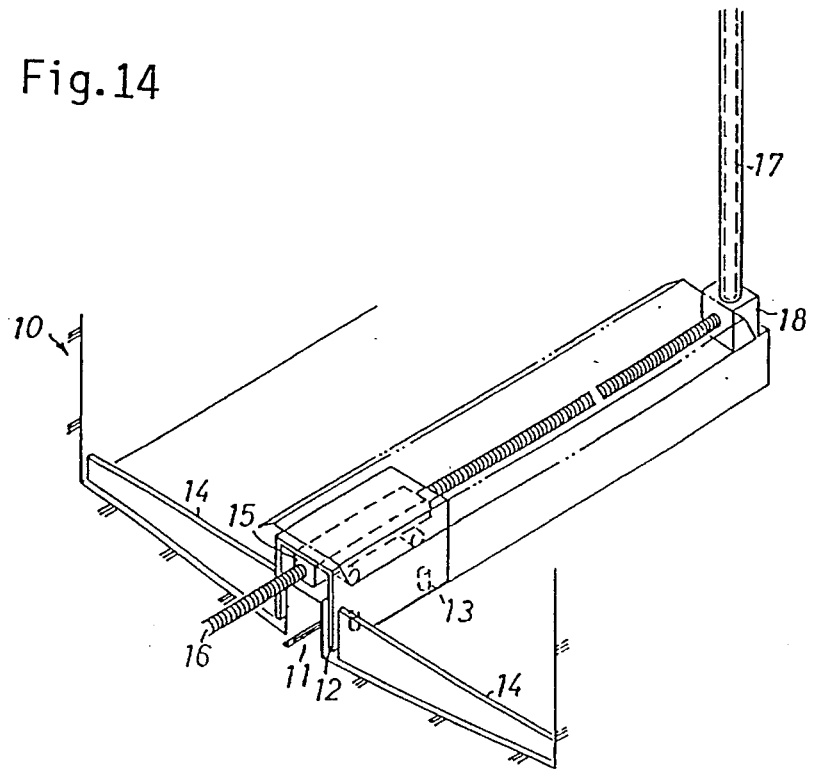
FIG. 14 is a side view showing an embodiment employing a screw shaft type driving method.

FIG. 14 shows another different embodiment of a sludge scraping apparatus. Numeral 10 is a settling pool, and this settling pool 10 has the bottom sloped laterally, and a protruding guide 11 is formed integrally (or separately) in the middle of the bottom. A U-shaped work member 12 straddles over the guide 11. The work member 12 comprises rollers 13, and is free to reciprocate back and forth.

At both sides of the work member 12, the scraping members 14, 14 are disposed so as to set in vertical position when moving in the scraping direction or one direction, and to escape obliquely when moving in the return direction. Inside the upper part of the work member 12, a screw body 15 is fixed, and a screw shaft 16 on the guide 11 is engaged therewith. Above the pool, a drive source is provided, and it is designed to rotate the screw shaft 16 through a transmission shaft (with cover) 17 and a gear box 18.

When the screw shaft 17 is rotated normally or reversely, the work member 12 is moved reciprocatively back and forth by the screw body 15. As a result, the scraping member 14 scrapes in one direction, and returns in the reverse direction. A cover shown by a double dotted line may be provided, incidentally, above the moving region.

Figure 15:
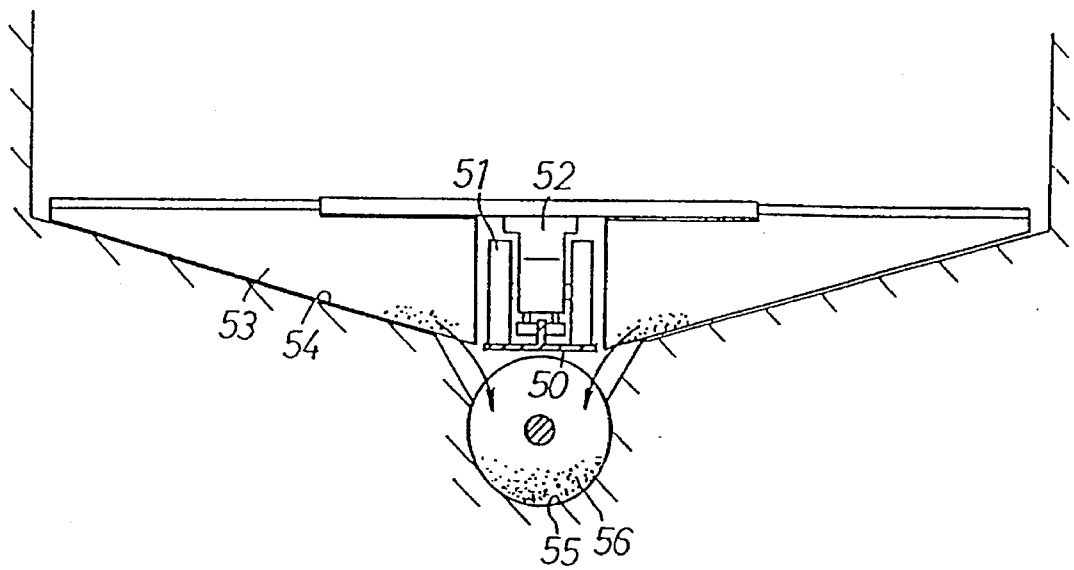
FIG. 15 is a longitudinal sectional view showing an embodiment for discharging the sludge from the scraping member through the bottom of the pool by a screw system.

FIG. 15 relates to a different embodiment. In this embodiment numeral 50 is a guide, and a machine body (work member) 52 with relatively large wheels 51 reciprocates back and forth along the guide 50. The machine body 52 is provided with a scraping member 53 so as to scrape and collect the sediment on a slope bottom wall 54. When the sediment is gathered to the middle in the width direction, it is dropped into a conveying route 55 formed at the lower side of the guide 50, and is further sent into a pit by a screw (conveying means) 56 provided in the conveying route 55. Of course, the sludge is also collected by the scraping member 53. The scraping member 53 may be composed of an oblique blade as seen from the plane so that both ends may advance while the middle base part may follow.

In FIG. 15, as conveying means, an evacuating method or chain scraping method may be employed.

Figure 16:
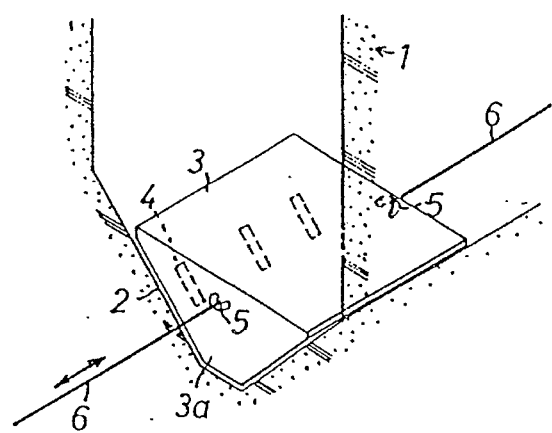
FIG. 16 is a perspective view showing an embodiment in which the bottom of the pool itself serves as a guide.

FIG. 16 shows a different embodiment of a sludge scraping apparatus. In this embodiment, numeral 1 is a settling pool, and a one-body guide 2 of monorail type is extended in the bottom of the settling pool 1. This guide 2 is approximately shaped in a V form.

The guide 2 is provided with a V-shaped work member 3 so as to be guided by rollers 4 disposed on the surface of the guide 2.

This work member 3 is a heavy object, and stopping hooks 5 are provided at front and rear walls thereof, and a wire 6 is hooked thereon as driving means so as to pull and move reciprocatively. This pulling action is driven by a sprocket and a motor from above the pool.

The front side of the work member 3 itself forms a scraping surface 3a. When the work member 3 moves in one direction, the sediment is collected in the direction of a pit (not shown), and the sediment is discharged out of the system by a pump. The driving means comprises, aside from the wire, chain, screw shaft or others.

Figure 19:
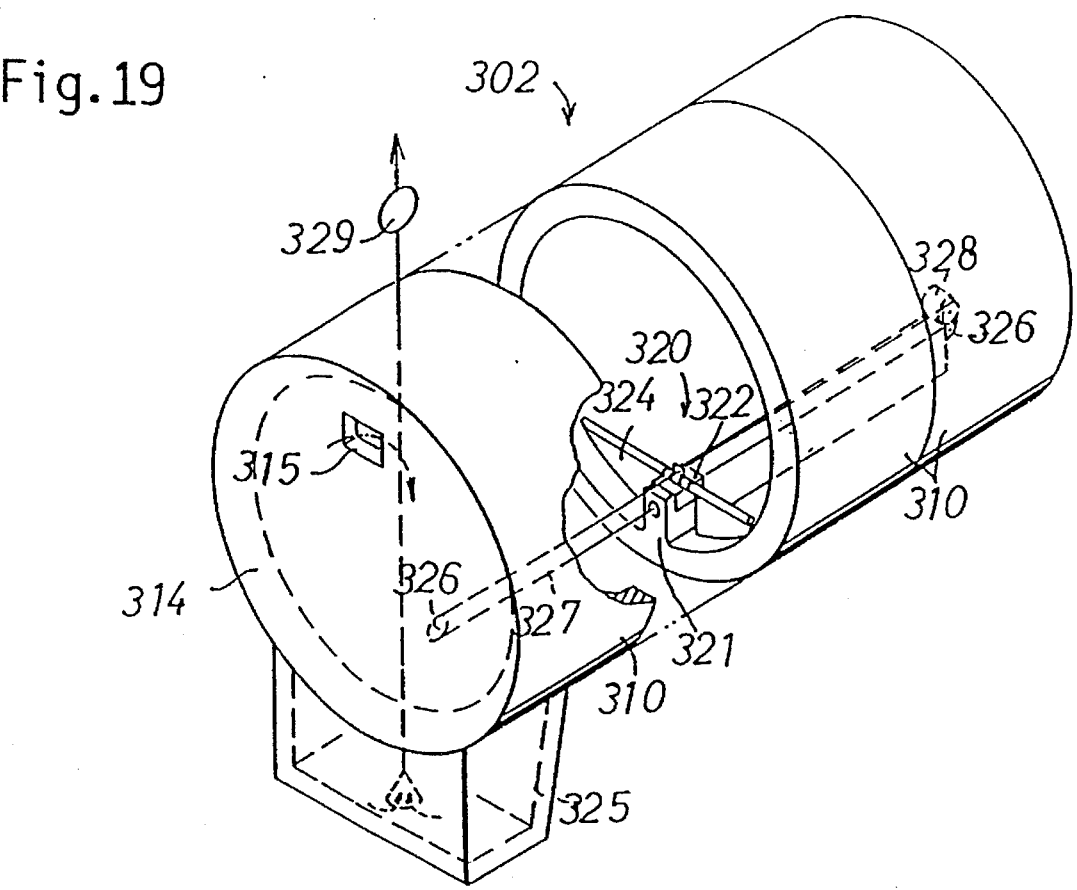
FIG. 19 is a fragmentary perspective view of the sludge scraping apparatus of FIG. 17.

FIG. 17 to FIG. 19 show an outline of this system. Herein, numeral 301 is a sand sedimentation pool, 302 is a first settling pool, 303 is an aeration tank, 304 is a final settling pool, and 305 is a chlorine feed tank.

These treating facilities are all formed within the internal space of tubular blocks 310. In FIG. 17, numeral 311 indicates a route coming up from a river, and it is divided into two routes 313, 313 having gate means 312 so as to be led into twin sewage treatment system S. The portion projecting downward in FIG. 18 corresponds to the pit portion in the settling pool.

The first settling pool 302 shown in FIG. 19 is combined of for blocks 310, and the front and rear ones have closing parts 314 for forming an internal space. Hence, the four blocks 310 form one partitioned space.

Numeral 315 is a flow inlet formed in the closing part 314, so that sewage may flow in from the sand sedimentation pool 301. A similar flow outlet is provided at the other end of the first settling pool 302, so as to communicate with the aeration tank 303. Inside the first settling pool 302, a scraping device 320 is composed in the bottom.

The scraping device 320 has a guide 321 in its bottom. On the guide 321, a work member 322 is disposed in a straddling manner, being movable reciprocatively through rollers 323, and a scraping member 324 is provided so as to extend to the right and left sides through the support member disposed on the work member 322. The scraping member 324 is to collect the sediment flowing in from the flow inlet 315 to the pit 325 side, and is guided in the manner of the monorail type.

The means for reciprocating the scraping member 324 is composed of a sprocket 326, a chain 327, and a submerged pump 328 provided at the front and rear ends of the guide 321. That is, as the chain 327 is driven in reciprocating manner, the scraping member 324 reciprocates.

The single track type (or monorail type) herein includes both the definite single track and the type similar to the single track type. That is, same as in the following embodiment, the single track type is either composed of one rail or a plurality of rails. In the case of a plurality, each rail may be adjacent parallel, close to each other parallel, or at a short distance. All of them are defined to be of single track type. Two rails set apart widely as in the prior art are excluded.

FIG. 20 to FIG. 29 show another embodiment of the invention.

Figure 20:
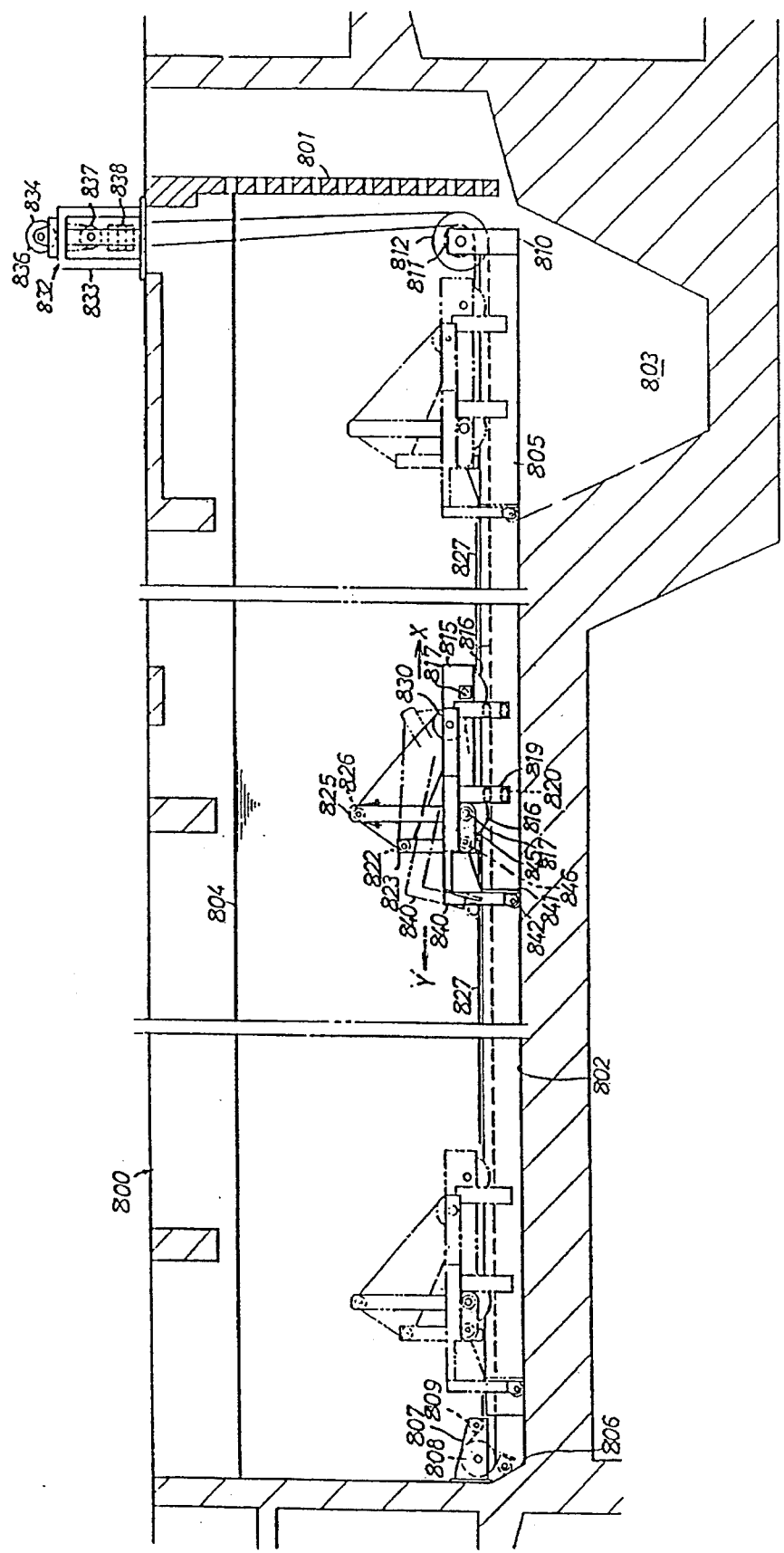
FIG. 20 is a general cross-sectional view showing another embodiment of the present invention.
Figure 21:
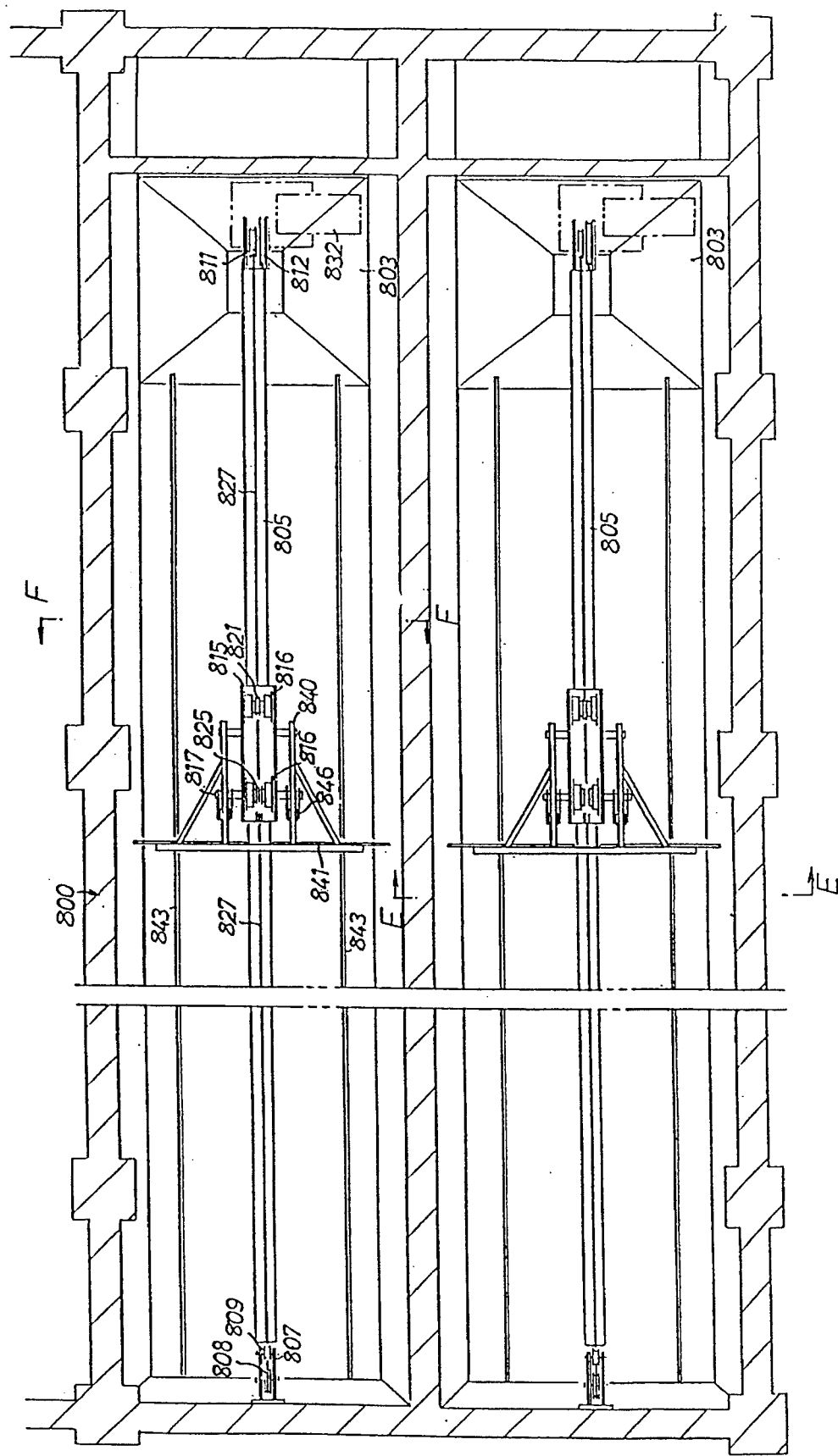
FIG. 21 is a plan view of the sludge scraping apparatus of FIG. 20.
Figure 22:
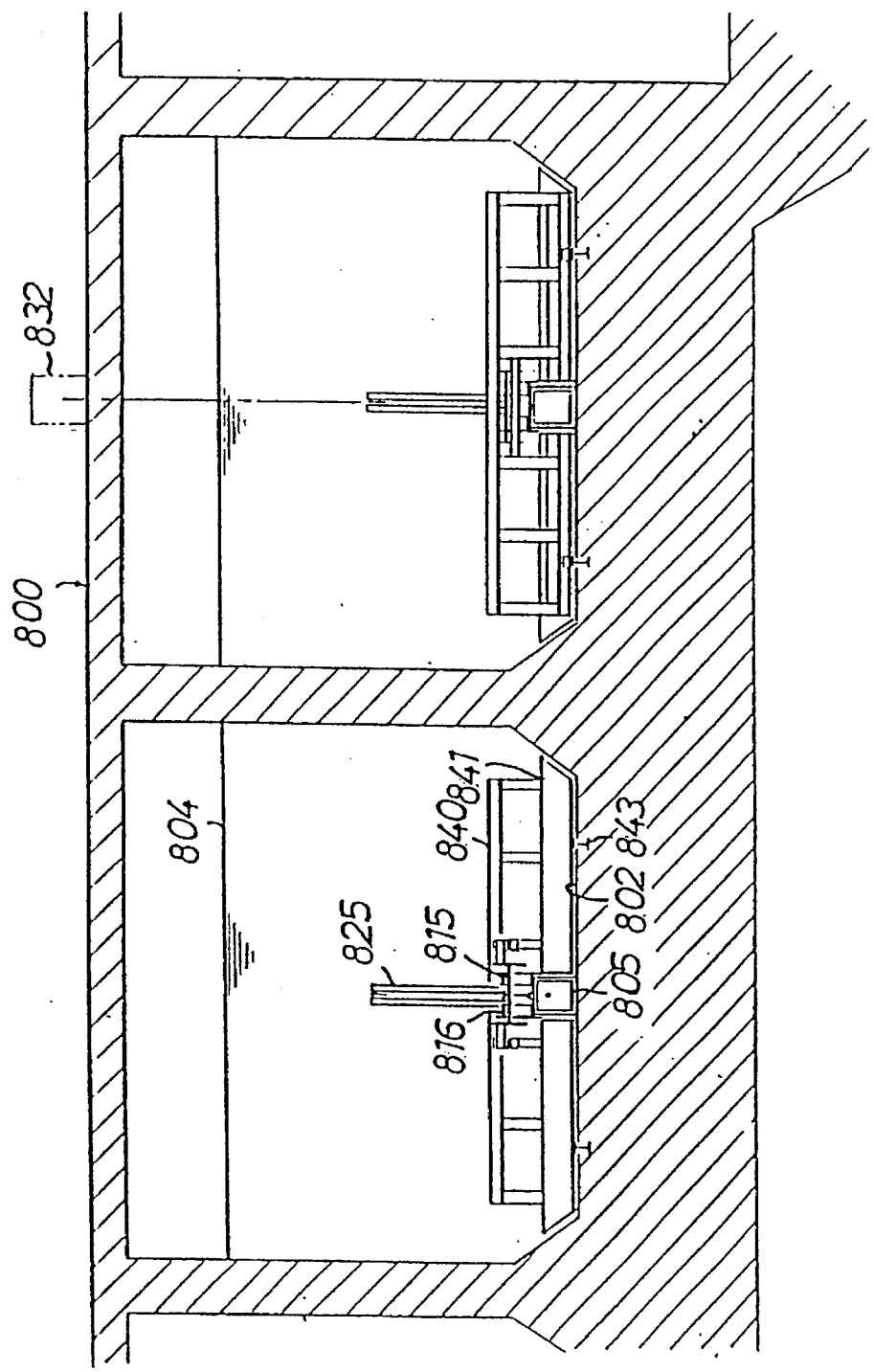
FIG. 22 is a sectional view taken along the line F—F in FIG. 21 on the left part, and along the line E—E in FIG. 21 on the right part.

In the sludge scraping apparatus shown in the embodiment, numeral 800 is a settling pool, and is rectangular as shown in FIG. 21. Numeral 801 in FIG. 20 is a straightening plate provided at the flow-in side, and possesses multiple holes. Numeral 802 is the bottom of the pool, and is moderately sloped to the direction of a pit 803. Numeral 804 is a water level.

X denotes the sludge scraping direction, and Y shows the return direction. Numeral 805 is a guide, which is fixed along the middle portion in the width direction of the bottom 802 of the pool, its cross section is in a form of a rectangular tube, and projects upward from the bottom 802 of the pool as single track type. This guide 805 is disposed one for each pool, and one end is disposed at the anti-pit side end and the other end on the pit 803.

At one end of the anti-pit side of the guide 805, a wheel 808 for inverting and a guide hole 809 are provided through a bracket 807, and at the end of the pit 803 side, first and second lead wheels 811, 812 are disposed parallel and rotatably independently as large and small wheels, respectively, through brackets 810.

Numeral 815 is a work member, and this work member 815 is U-shaped and is disposed so as to sit on the guide 805 with the groove downward. At front and rear ends of the work member 815, flanged travel rollers 816 are supported and disposed on a rotary shaft 817 so as to be four points as seen from above.

At the lateral side of the work member 815, brackets 819 are disposed at four points as seen from above, and each bracket 819 is provided with a pair of upper and lower side rollers 820 so as to contact with the lateral side of the guide 805. Numeral 821 is a first wheel provided independently rotatably about the front side rotary shaft 817, and 822 is a second wheel disposed on the upper end of a bracket 823 set up from the rear end upper surface of the work member 815.

From the top of the work member 815, a swing arm 825 reciprocatively oscillatable on the vertical plane is set up, and a free wheel 826 is attached to the upper end of the arm 825. One end of the wire 827 which is an interlock member is coupled to an L-shaped bracket 828, in an adjustable length, projecting toward the front side of the arm 825 through the free wheel 826 of the swing arm 825 as a wire part of the scraping side.

The wire 827 is extended through the second wheel 822 and first wheel 821, and is freely driven by a drive source 832 through the first lead wheel 811. On the other hand, in the other L-shaped bracket 829, similarly, the other end of the wire 827 is coupled in an adjustable length. The wire 827 is extended backward through a third wheel 830 and a fourth wheel 831 provided in the work member 815, and through the guide wheel 809 and inverting wheel 808, it further extends forward through the internal space of the guide 805, being thus lead into the direction of the drive source 832 through the second lead wheel 812.

Figure 28:
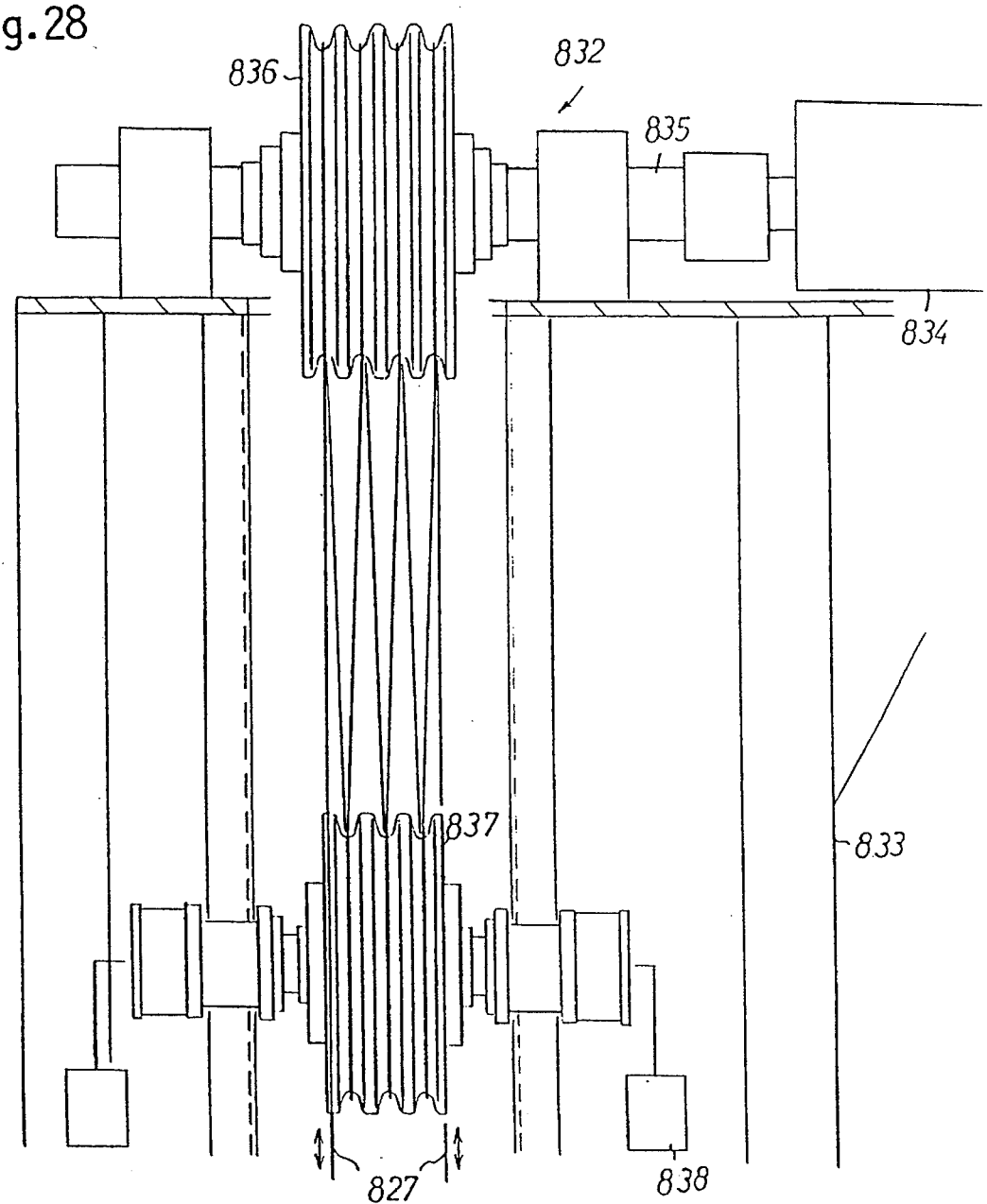
FIG. 28 is a longitudinal sectional view of a drive source.
Figure 29:
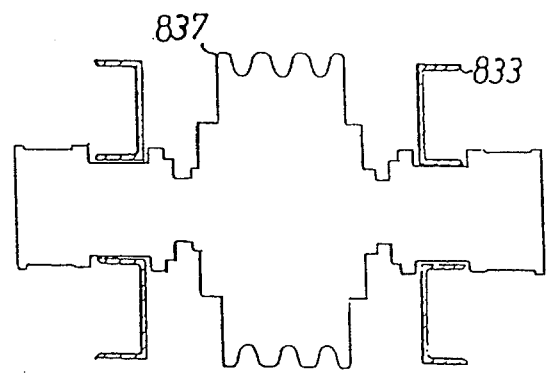
FIG. 29 is a cross-sectional view of the drive source of FIG. 28.

The drive source 832 is, as specifically shown in FIG. 28 and FIG. 29, constituted so as to mount a motor 834 with reduction gear on a frame 833 fixed above the upper surface of the pool, and an upper sheave 836 is provided on its output shaft 835, and a lower sheave 837 beneath it. The wire 827 is wound from either one of the lead wheels 811, 812, and is wound several times between the lower sheave 837 and upper sheave 836, and is extended downward through the lead wheels 811, 812.

The lower sheave 837 is movable vertically in order to absorb relaxation of the wire 827 when changing over between the scraping state and the returning state, and in order to absorb smoothly and securely, a weight 838 is added to the shaft of the sheave 837, and is thrust always downward. This thrusting may be effected by other means such as cylinder and accumulator.

Figure 23:
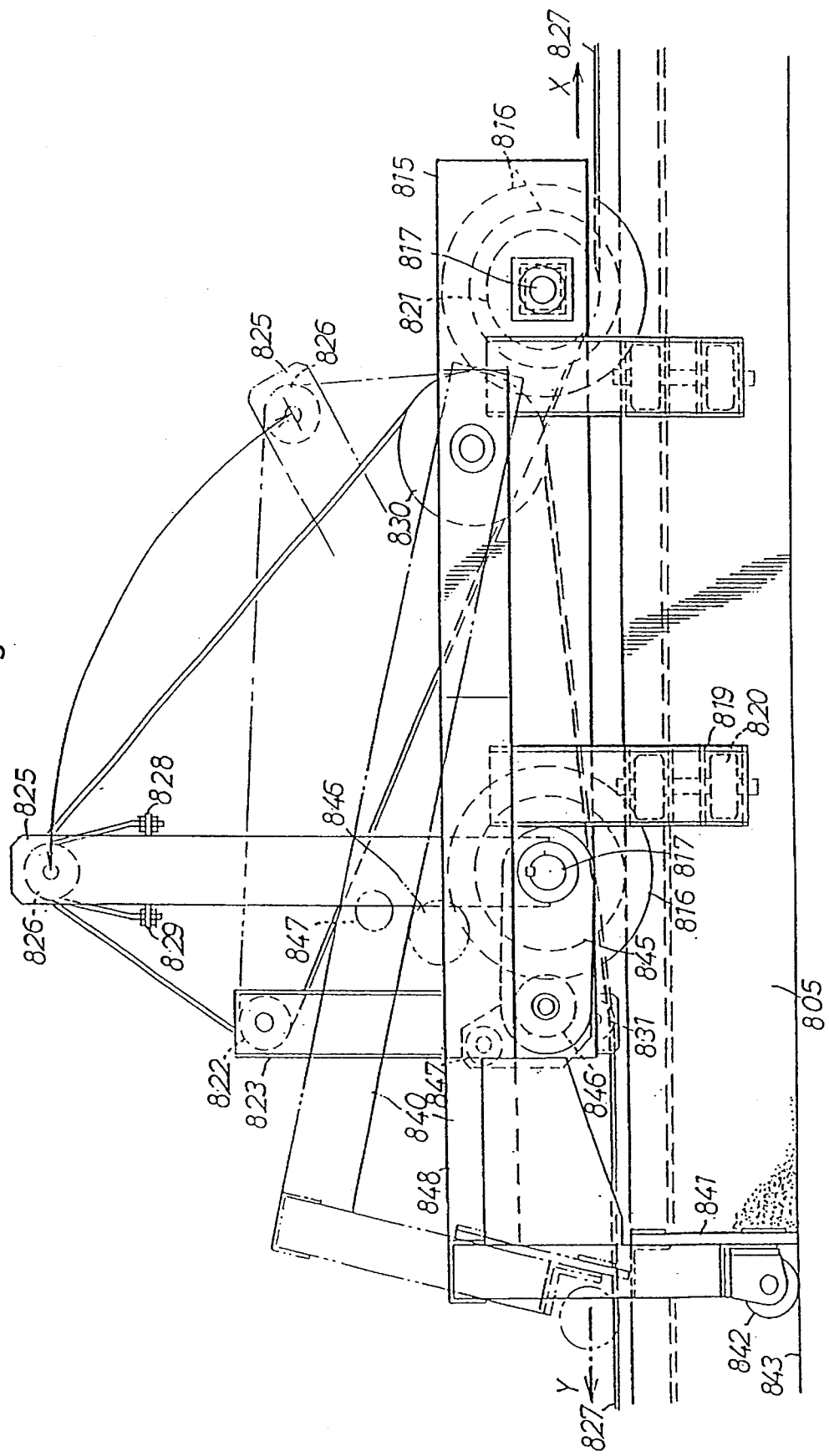
FIG. 23 is an enlarged sectional view of essential parts of the apparatus.
Figure 24:
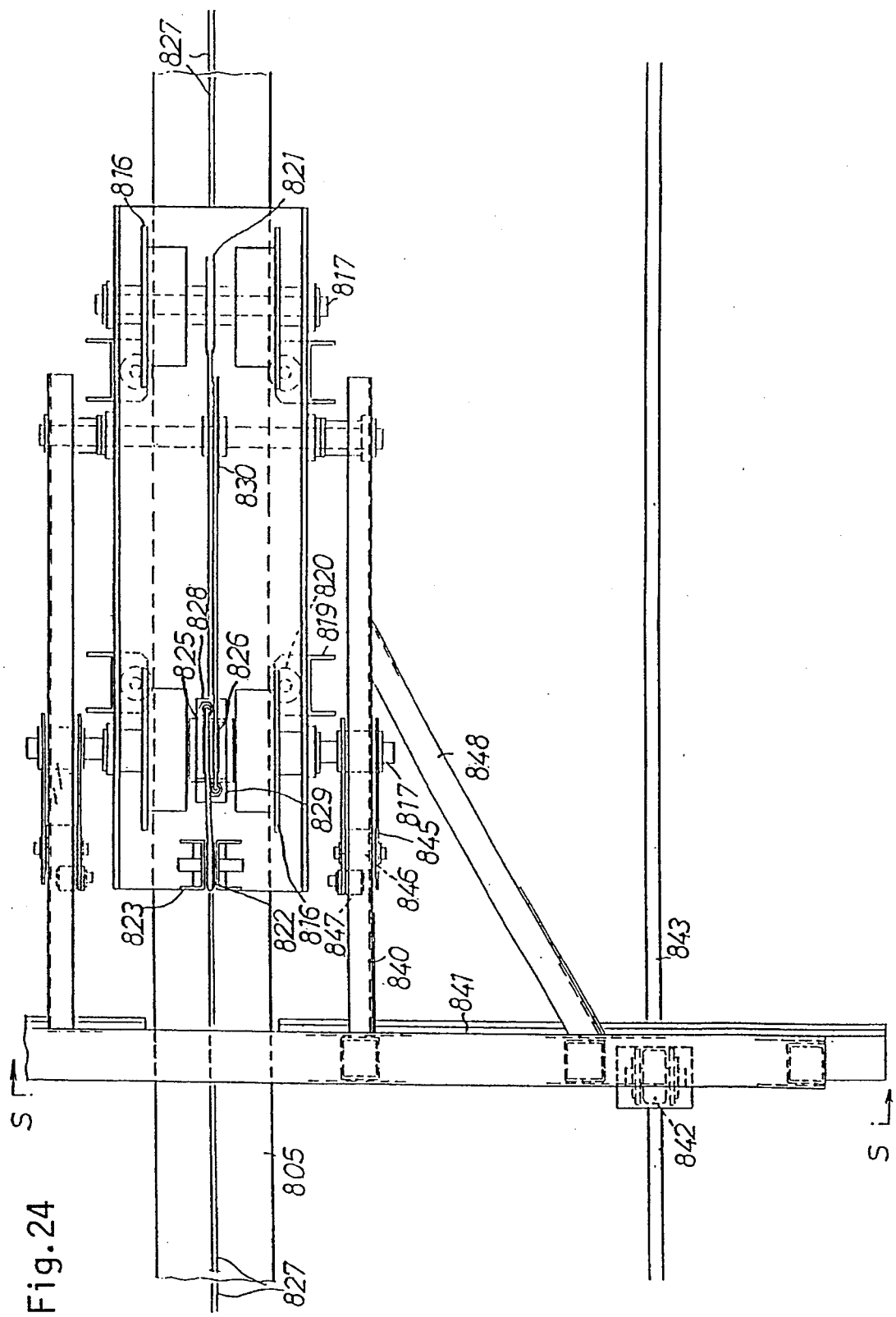
FIG. 24 is a plan view of the device shown in FIG. 23.
Figure 25:
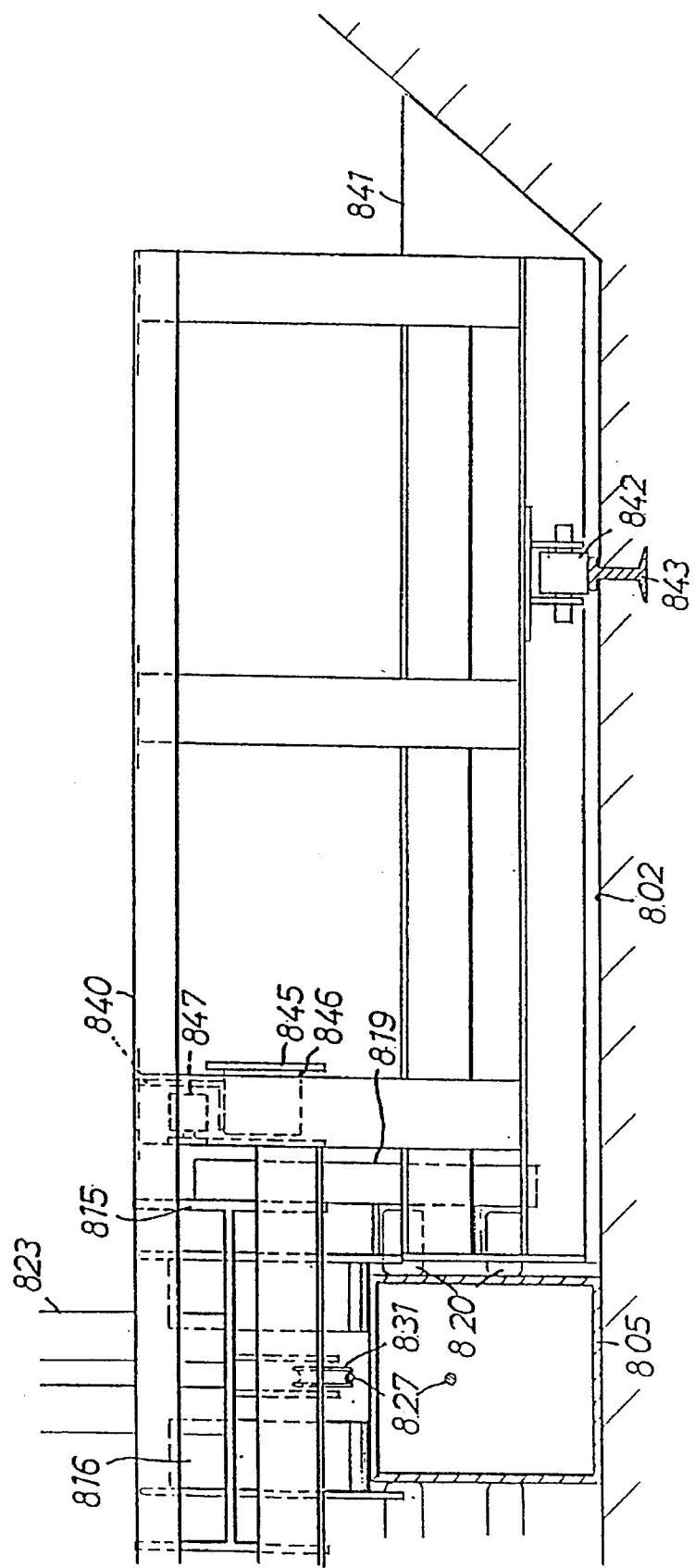
FIG. 25 is sectional view taken along the line S—S in FIG. 24.
Figure 26:
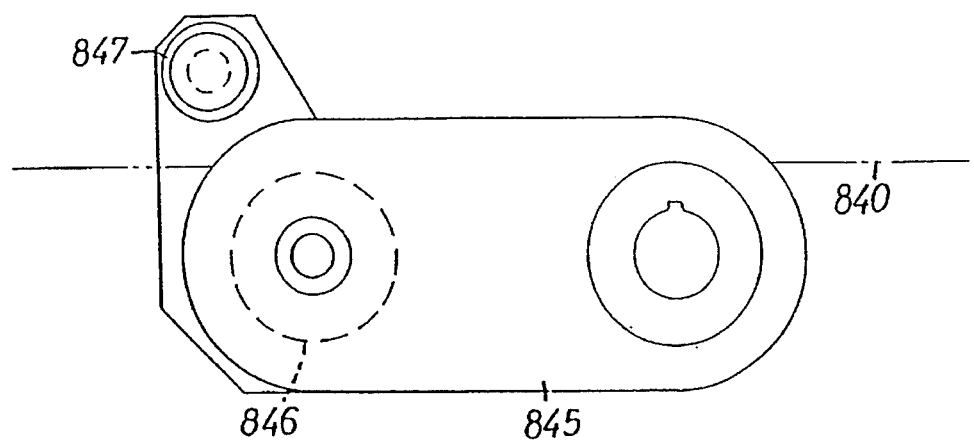
FIG. 26 is an enlarged side view of essential parts of the work arm, work roller, and return roller.
Figure 27:
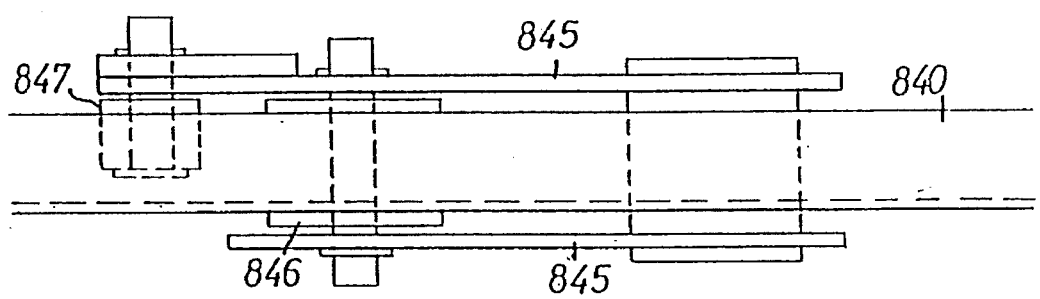
FIG. 27 is a plan view of the work arm, work roller, and return roller.

At the right and left side of the work member 815 in FIG. 23, a scraping arm 840 supported oscillatably vertically, coaxially with the rotary shaft 817 is extended backward. The rear end of the arm 840 is extended vertically downward, and a pair of right and left scraping members 841, 841 are provided through this portion. Behind the scraping member 841, a lower roller 842 is provided, and the roller 842 is free to roll on a pair of right and left guide rails 843 fixed on the bottom of the pool 802.

The following mechanism is employed for changing over the scraping state with the scraping arm 840 and scraping member 841 lowered, and the elevated return state.

That is, numeral 845 is a work arm, and a base part thereof is attached to the rear right and left ends of the rear rotary shaft 817, and is free to oscillate together with the swing arm 825. The arm 845 is an oval plate, and a work roller 846 is attached to its front end. The work roller 846 always contacts with the lower surface of the scraping arm 840, and lifts the scraping arm 840 when the swing arm 825 tilts forward from the vertical state. When the swing arm 825 returns to the vertical position, it descends while always contacting with the scraping arm 840, and in order to secure the lowering action of the U-shaped scraping arm 840, a return roller 847 with a horizontal axis is provided at the front portion of the scraping arm 840 and protrudes into a groove of U-shaped scraping arm 840 to push down the arm 840 by force. It may be also constituted so as to move up and down the arm 840 by the return roller 847 only by fitting the return roller 847 into the scraping arm 840.

Numeral 848 is a reinforcing stay provided in the scraping arm 840.

The state indicated by solid line in FIG. 20 and FIG. 23 is the scraping state, and the state indicated by virtual line is the return state. Scraping is effected as the apparatus runs from the left end to the right end in FIG. 20. That is, at the left end, the scraping member 841 is elevated at the return end, and as indicated by virtual line, as the wire 827 is pulled to the right direction, the swing arm 825 is raised from the tilted state through the first wheel 821 and second wheel 822. As a result, the slant wall 806 connecting between the bottom 802 of the pool and the vertical wall is scraped off of the sludge sedimenting by the scraping member 841.

When the scraping member 841 is lowered fully to the bottom 802 of the pool, the sludge deposited in the bottom of the pool is collected. That is, the lower roller 842 contacting the guide rail 843 advances while rolling. The work member 815 runs at low speed stably as being guided along the guide 805 by the traveling roller 816 and side roller 820, and when the wire 827 is pulled to the right at this time, the swing arm 825 maintains the vertical state, and the scraping member 841 also maintains the vertical state, thereby collecting the sludge in the direction of arrow X. Thus, the sludge is dropped into the pit 803.

In the scraping state, meanwhile, the swing arm 825 is vertical, and the wire 827 is set longer on the whole. At this time, the shortage of length of the wire is absorbed as the lower sheave 837 ascends in the drive source 832. When changing over from the scraping state to the return state, the operation is reverse, and the looseness is absorbed by the drive source 832.

When the work member 815 is on the pit 803, the scraping state is changed to the return state. The wire 827 is pulled in the direction of arrow Y. As a result, the wire 827 is pulled through the fourth wheel 831 and third wheel 830, and the swing arm 825 is tilted down from the vertical state through the second wheel 822. As a result, the work arm 845 oscillates upward through the rotary shaft 817, and the work roller 846 is raised to push up the oscillating arm 840. The scraping member 841 is raised to be in return state. Afterwards, the work member 841 begins to run, and returns to the left end in the diagram.

When the work member 815 comes to the left end and the wire 827 is pulled in the direction of arrow X, the swing arm 825 stands up vertically, and the work roller 846 is lowered, and the scraping arm 840 is lowered by the return roller 847, so that the scraping member 841 is set in the specified scraping position by the stopper mechanism of the lower roller 842.

Figure 30:
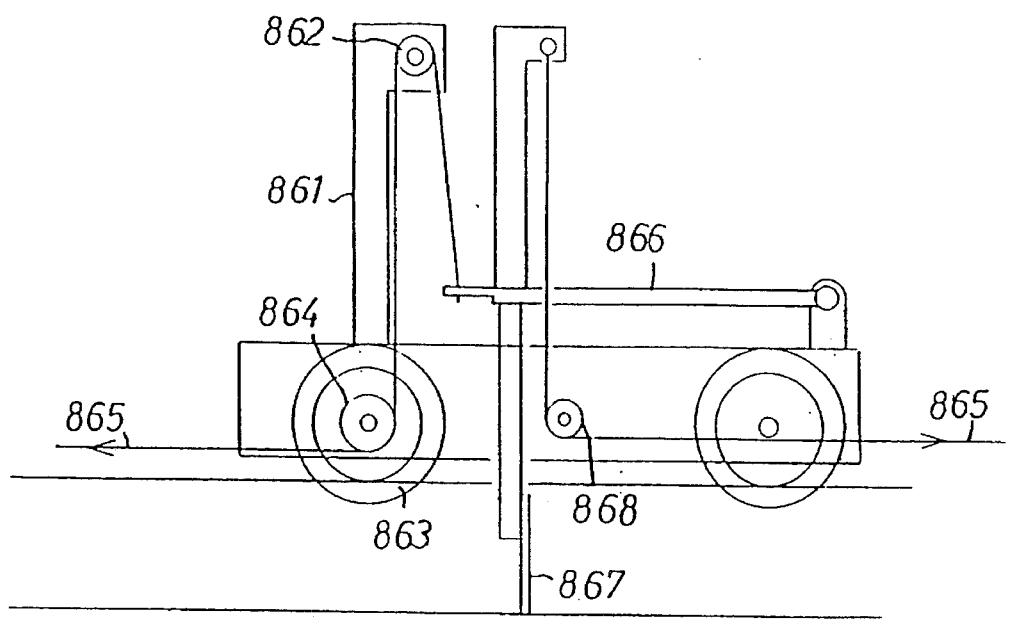
FIG. 30 is a schematic view showing a further different embodiment.

Besides, as shown in FIG. 30, in other constitution, a post 861 is set up on a work member 860, and a second wheel 862 is provided, and a wire 865 from a first wheel 864 provided around the shaft of the traveling roller 863 is hooked on the second wheel 862, and by the action of the pulley, the scraping arm 866 is lifted thereby raising the scraping member. In the return state, the wire 865 is pulled through a third wheel 868 to pull down the scraping member 867.

INDUSTRIAL APPLICABILITY

Thus, the sludge scraping apparatus of the invention is very simple in structure of the apparatus and easy to install, while maintaining the scraping performance at high level, and hence it is suitable to any application where low cost on the whole and low maintenance control expenses, or the like are required.

What is claimed is:

1. A sludge scraping apparatus, for scraping sludge from a treatment pool, comprising:

a monorail guide disposed longitudinally in a sludge scraping direction of a treatment pool;

a work member straddling said monorail guide and having a plurality of rollers disposed in rolling contact with said monorail guide;

a scraping member attached to said work member; and a scraping arm pivotally attached to said work member and having said scraping member disposed on one end thereof;

drive means for driving said work member in scraping and non-scraping directions, said drive means being connected to and driving said scraping arm to a non-scraping position when said work member is driven in a non-scraping direction and to a scraping position when said work member is driven in a scraping direction;

wherein said drive means includes:

an oscillating arm fixedly connected to said scraping arm;

at least one wire cable connected to said oscillating arm to both pull said oscillating arm to a scraping or a non-scraping position and pulling said work member in a scraping or a non-scraping direction.

2. The sludge scraping apparatus according to claim 1, wherein said plurality of rollers on said work member include at least one pair of side rollers, one pair of upper rollers and one pair of hold down rollers.

3. A sludge scraping apparatus, for scraping sludge from a treatment pool, comprising:

a monorail guide disposed longitudinally in a sludge scraping direction of a treatment pool;

a work member straddling said monorail guide and having a plurality of rollers disposed in rolling contact with said monorail guide;

a pair of scraping members attached to said work member; and a pair of scraping arms attached to said work member, said scraping members disposed on one end of a respective scraping arm;

drive means for driving said work member in scraping and non-scraping directions, said drive means being connected to and driving said scraping arms to a non-scraping position when said work member is driven in a non-scraping direction and to a scraping position when said work member is driven in a scraping direction;

wherein said drive means includes:

a pair of interlock arms connected to said pair of scraping arms;

an interlock link connected between said pair of interlock arms;

a drive source; and wire cables connected to each of said interlock arms and driven by said drive source to both pull said interlock arms to a scraping or a non-scraping position and pulling said work member in a scraping or a non-scraping direction.

4. The sludge scraping apparatus according to claim 3, wherein said plurality of rollers on said work member include at least one pair of side rollers, one pair of upper rollers and one pair of hold down rollers.

5. A sludge scraping apparatus, for scraping sludge from a treatment pool, comprising:

a monorail guide disposed longitudinally in a sludge scraping direction of a treatment pool;

a work member straddling said monorail guide and having a plurality of rollers disposed in rolling contact with said monorail guide;

a scraping member attached to said work member; and a scraping arm pivotally attached to said work member having said scraping member disposed on one end thereof;

drive means for driving said work member in scraping and non-scraping directions, said drive means being connected to and driving said scraping arm to a non-scraping position when said work member is driven in a non-scraping direction and to a scraping position when said work member is driven in a scraping direction;

wherein said drive means includes:
   a swing arm pivotally connected to said work member;
   a work roller connected to said swing arm and in contact with said scraping arm such that when said swing arm is rotated in a first direction, said work roller moves said scraping arm to a non-scraping position;
   a drive source; and
   wire cables connected to said swing arm and driven by said drive source to both pull said swing arm to a scraping or a non-scraping position and pulling said work member in a scraping or a non-scraping direction.

6. The sludge scraping apparatus according to claim 5, wherein said plurality of rollers on said work member include at least one pair of side rollers, one pair of upper rollers and one pair of hold down rollers.

* * * * *